(12) United States Patent
Clements

(10) Patent No.: US 10,732,721 B1
(45) Date of Patent: Aug. 4, 2020

(54) MIXED REALITY GLASSES USED TO OPERATE A DEVICE TOUCH FREELY

(71) Applicant: Sigmund Lindsay Clements, Montreal (CA)

(72) Inventor: Sigmund Lindsay Clements, Montreal (CA)

(*) Notice: Subject to any disclaimer, the term of this patent is extended or adjusted under 35 U.S.C. 154(b) by 0 days.

(21) Appl. No.: 15/253,913

(22) Filed: Sep. 1, 2016

Related U.S. Application Data

(63) Continuation-in-part of application No. 14/634,788, filed on Feb. 28, 2015.

(60) Provisional application No. 62/213,630, filed on Sep. 3, 2015.

(51) Int. Cl.
| | |
|---|---|
| *G06T 19/00* | (2011.01) |
| *G06F 3/01* | (2006.01) |
| *G06F 3/16* | (2006.01) |
| *G06F 3/041* | (2006.01) |
| *G03H 1/08* | (2006.01) |
| *G02B 27/01* | (2006.01) |
| *G03H 1/26* | (2006.01) |

(Continued)

(52) U.S. Cl.
CPC ......... *G06F 3/017* (2013.01); *G02B 27/0093* (2013.01); *G02B 27/0172* (2013.01); *G03H 1/0005* (2013.01); *G03H 1/08* (2013.01); *G03H 1/26* (2013.01); *G06F 3/013* (2013.01); *G06F 3/016* (2013.01); *G06F 3/041* (2013.01); *G06F 3/167* (2013.01); *G06T 19/006* (2013.01); *G02B 2027/014* (2013.01); *G02B 2027/0141* (2013.01); *G02B 2027/0174* (2013.01); *G02B 2027/0178* (2013.01); *G03H 2001/0061* (2013.01); *G06F 2203/0384* (2013.01)

(58) Field of Classification Search
None
See application file for complete search history.

(56) References Cited

U.S. PATENT DOCUMENTS

| | | | |
|---|---|---|---|
| 8,253,685 B2 * | 8/2012 | Katayama | G02B 27/017 345/156 |
| 8,786,675 B2 | 7/2014 | Deering | |

(Continued)

OTHER PUBLICATIONS

Kansaku et al., "My thoughts through a robot's eyes: An augmented reality-brain-machine interface," Elsevier, 2010.*

(Continued)

*Primary Examiner* — Nicholas R Wilson

(57) ABSTRACT

Mixed reality glasses allow, a user to input into the glasses, to operate a device sanitarily. The glasses are connected, to the device wirelessly. The user views holograms in mid-aid air, while looking through the glasses. The holograms are input buttons, for the device. The user's input into the glasses, activates the holographic input buttons. User input devices in the glasses detect the user's input. User input devices include, an eye tracker, a voice recognition device, an eye gaze and hand gesture input device, a touch input device, and a thought input device. The devices operated by the glasses, may include, an elevator, a smart toilet, and a medical device. The user operates the device, touch freely, without touching the device's physical input buttons. Contact with harmful bacteria is deceased by operating the device, touch freely, which avoids bacteria, that may be on the device's input buttons.

18 Claims, 21 Drawing Sheets

(51) Int. Cl.
*G02B 27/00* (2006.01)
*G03H 1/00* (2006.01)

(56) References Cited

U.S. PATENT DOCUMENTS

| | | |
|---|---|---|
| 9,298,007 B2 | 3/2016 | Border |
| 2016/0165170 A1* | 6/2016 | McRae ............... H04N 5/4403 348/734 |

OTHER PUBLICATIONS

Monnai et al., "HaptoMinne: Mid-Air Haptic Interaction with a Floating Virtual Screen", UIST 2014. (Year: 2014).*
U.S. Appl. No. 60/467,128, filed Apr. 4, 2000, William E. Beller, Timothy P. O'Hagan.
David M. Ewalt, Inside Magic Leap, The Secretive $4.5 Billion Startup Changing Computing Forever, Forbes.com, Nov. 29, 2016, New York, New York.
Dominic Basulto, Why your car shouldn't come with a pair of augmented-reality goggles, washingtonpost.com, The Washington Post, Apr. 21, 2015, Washington, The District of Columbia.

\* cited by examiner

MIXED REALITY GLASSES USED TO OPERATE A DEVICE TOUCH FREELY

CROSS REFERENCE TO RELATED APPLICATIONS

This application claims the benefit of provisional patent applications serial No. 62/213,630 filled on Sep. 3, 2015, and 62/297,804 filled on Feb. 20, 2016.

FEDERALLY SPONSORED RESEARCH

Not Applicable

SEQUENCE LISTING OR PROGRAM

None

TECHNICAL FIELD

This description relates to mixed reality glasses, having a user interface, specifically to the mixed reality glasses being used, to operate a device.

BACKGROUND OF THE EMBODIMENTS

Avoiding Bacteria on Touch Input Buttons

Many people don't like to touch input buttons, that may have harmful bacteria on them, such as, public input control panels. Control panel input buttons, which are touched by multiple users, have the problem of accumulating germs on their surfaces, which are transferred from the users to the buttons. The bacteria on the buttons, may be transferred to the users, when they touch the buttons.

Avoiding finger contact with a touch input button, reduces the contact, and transmission, of possibly harmful pathogens on the button. Reducing or eliminating bacterial transmission, from the buttons to the user, reduces the possibility of the user becoming ill, from bacteria transmitted to the user.

Avoiding Bacteria by Using a Smart Phone

A smart phone can be used to operate devices such as, a smart toilet, or vending machine. The phone frees a user, from needing to touch input buttons, used by multiple users. A drawback is the user needs to hold the phone, in their hand.

Augmented Reality Glasses Used to Operate a Device

Augmented reality glasses, such as, Google glasses, use visual information displayed on the glasses lenses, and viewable by the user. The Google glasses can use voice recognition, to operate a video camera that's part of the glasses. The voice recognition allows the user operate the camera, without needing to touch input buttons. The glasses aren't used to operate devices remotely.

A Proximity Sensor Used to Detect a User's Hand in Mid-Air

Infrared hand sensors are used to operate devices in bathrooms, without touching a surface, such as, water faucets of sinks, toilet flushers, and hand dryers. In Hospitals motion sensing is used to open doors, without a user needing to touch a surface. The sensors have limited input commands, such as, on or off, which restricts the number of different inputs that can be used.

Mid-Air Holographic Input Buttons Used to Operate Devices

MID-AIR holographic input buttons, can be touched in mid-air, and used as input buttons for a device. The buttons can be made by devices, that project on to mid-air water droplets, optical illusion devices, and lasers beam projecting plasma in mid-air. A camera detects when the user touches the button, with their finger. Since there aren't bacteria in mid-air, the finger avoids contacting bacteria when touching the buttons. Though the touch free devices are stationary, and not portable.

Ineffective Ways to Avoid Bacteria

Some people try to wrap paper around their hand, before touching control panel buttons, in an effort to try to put an antibacterial barrier between their hand and the buttons. The paper barrier is ineffective, since bacteria can easily travel through paper.

People may try to use a piece of clothing, such as, a part of a shirt sleeve as a barrier between the buttons, and the hand. The shirt sleeve may act as a barrier; thought bacteria can attach to the user's shirt sleeve.

Disposable rubber gloves may be effective, in using the buttons sanitarily, though it may be inconvenient to carry, and use gloves. Anti-bacterial swipes can be used to eliminate bacteria on buttons, though the discarded wipes produce waste.

Disadvantages

Many of the devices used to avoid touching input buttons, used to operate a device, heretofore known suffer from a number of disadvantages:

a) Bacteria and viruses can be transmitted to users, who touch control panel buttons on a multiuser touch screen display.

b) A user may inadvertently touch a device, having bacteria on it, while mid-air inputting near the device. It may be the difficult to judge a finger's distance, from an input device while mid-air touch inputting, which may lead to the finger inadvertently touching the device.

c) A static electric discharge may be created as a user touches an input screen, or input button, which maybe be hazardous in flammable environments.

d) Most remote controls used to operate a device, require hand operation to operate the remote. The user might wish for, hands free operation of the remote.

e) Augmented reality headsets aren't configured to operate, many devices wirelessly, at a distance.

f) Some mid-air hand gesture input sensors aren't portable, such as, laser input buttons, motion sensors, and mid-air hand sensors.

An improved input device, such as, an augmented reality glasses, which allows a user to operate a device touch freely, and at a distance is needed.

SUMMARY

Users avoid contact with bacteria, while operating a device, by using mixed reality glasses, which are connected to the device, to input into the device.

Touch input devices, that are used by many users, may accumulate harmful bacteria, from users touching input buttons. The bacteria may spread, to the users touching the buttons. Examples of multi-user devices include, a smart toilet, an elevator, and automatic teller machine.

Augmented reality AR, or mixed reality MR glasses, which include a HoloLens glasses, or google magic leap glasses. A computer is part of the glasses. The glasses are used to operate one, or many multi-user devices. The glasses connect to a device wirelessly, with both the glasses, and device each having a radio transmitter, and receiver.

The glasses have, a user interface. The user views input buttons on the lens, the viewed buttons give the user the perception that the buttons, are incorporated in the user's surrounding environment. The input buttons can be in mid-air, or pinned, objects in the environment. The buttons can be holographic, or two dimensional. The holograms are superimposed, on the viewable surroundings.

The holograms are associated to an operation of a device. The user inputs into the headset, to activate the mid-air input buttons. The activated input buttons, activate instructions to operate the device. The instructions are sent from the headset, to the device wirelessly, or activated in a device computer which is part of the device. The device uses the received instructions, to influence the operation of the device. Instructions can be activated in a device computer, which is part of the device Augmented Reality, or Mixed Reality Definition Mixed reality merges the real and virtual world using virtual reality (VR) technology. A mixed reality headset places virtual objects, in the real world, and allow users to interact with them, through gestures, and voice commands.

Augmented reality sometimes referred to as hybrid reality, is the merging of real and virtual worlds, to produce new environments and visualizations, where physical and digital objects co-exist, and interact in real time. Augmented reality takes place, not only in the physical world, or the virtual world, but is a mix of reality, and virtual reality.

Augmented reality in technologies like Magic Leap's, virtual objects are integrated into, and responsive to, the natural world. A virtual ball under your desk, for example, would be blocked from view unless you bent down to look at it.

Mid-Air Hand Gesture Input

The user can input, one of the mid-air input buttons, by touching of one of the mid-air input buttons with their finger. The touch is detected, by a mid-air hand gesture sensor in the headset.

For example, a user can operate an elevator with an augmented headset. The headset connects wirelessly, to a computer, in the elevator. The user's finger can mid-air touch input, one of a number of viewed holograms, representing elevator input buttons. The touch inputs a request to the computer, in the headset. The computer directs, the elevator, to carry out the input request. The user touches a 4 floor input hologram, while inside an elevator. The 4 floor input is detected, by the headset. The computer directs, the elevator to move to the 4 floor.

Eye Tracker Input

The user gazes at, one of the mid-air input buttons, which will input the button. The user's eyes gaze is detected, by an eye tracker device, which is positioned in the headset, to view the user's eyes. The eye tracker sensor, is connected to the computer in the headset. The sensor sends the eye tracker input, to the processor. The user can input one of the mid-air input buttons, by using the eye gaze of their eyes.

Mind Thought Input

The user can input one of the mid-air input buttons, by using their thoughts. The user's thoughts generate electrical signals, which are detected by a mind thought sensor. The sensor is connected, to the computer in the headset. The sensor sends thought input, to the computer. The users' thoughts can be associated to inputting, of one or more of the buttons. The user uses their thoughts, to chose which mid-air input button, they want to activate.

Voice Recognition

The user can verbally, input one of the mid-air input icons, or letters of the mid-air display menu, by verbally describing one or more of the displayed mid-air input icons, or letters. Voice recognition detects the icon being described, such as, saying the number 5, activates a number 5 icon. The 5 icon is associated, to the number 5 word.

Eye Gaze and Hand Gesture Input

The user gazes at the icon that they want to activate, and uses a hand gesture to activate the icon.

Advantages of Operating a Device Touch Freely

The user can operate a machine, without contacting bacteria which may be on touch input buttons.

Advantages

There are multiple benefits to a user derived from using, an mixed reality headset, having a user interface, to operate a device.

a) A user can avoid, contact with bacteria, and viruses on physical input buttons, by replacing the input buttons with, bacteria free, mid-air input buttons.

b) The headsets can be configured to operate many devices, wirelessly, at a distance from the headset.

c) The headsets are portable, allowing the user move while operating a moving device. The user can also move to, and operate devices at different locations.

d) The user may enjoy the visually attractive input icons, visual colors, shapes, movement, and images of holographic input buttons. The input buttons visual colors, and shapes can be changed by the user.

e) Headset operation of devices can be used in work place environments. For example, the mobile headset may reduce the spread of anti-biotic resistant super bacteria, when used to operate hospital devices, such as, hospital elevators.

f) Headset operation maybe used in flammable environments to avoid static electric discharges, which may ignite flammable material.

g) The user may feel more connected to the mid-air display, and to the operation of the device.

h) Multiple input panels, can be associated to multiple different devices. The headset can display an input panel, or multiple input panels for multiple differing devices, without the need for many physical input panels, which saves the space of having many physical panels.

i) The headset allows, hands free operation of a device.

j) The dust produced by typing on keyboards is eliminated, which may be useful in dust free environments, such as, in semiconductor production areas.

k) The user can operate a device discreetly, without other people viewing the user operating the device, when the user uses eye tracker input, or thought input, to input holographic input buttons. Personal Identification Numbers (PIN) numbers can be inputted into financial input panels, without people viewing the number being inputted.

There is a desire, to provide an improved mixed reality headset, having a user interface. The improvement to the headset, is the connection of the headset, to different devices. The improvement allows a user to operate different devices, with the headset advantageously. The headset is improved, by the addition, of an eye tracker device, a thought input device, and a hologram touch sensing device.

Using an mixed reality headset to operate different devices, brings the future, of sanitary, fun, device input diversity, and safe holographic input, to the present now.

Still further benefits of the headset glasses, used to operate different devices, will become apparent from a study of the following description, accompanying drawings, and claims.

BRIEF DESCRIPTION OF THE DRAWINGS—FIGURES

Figure 4:
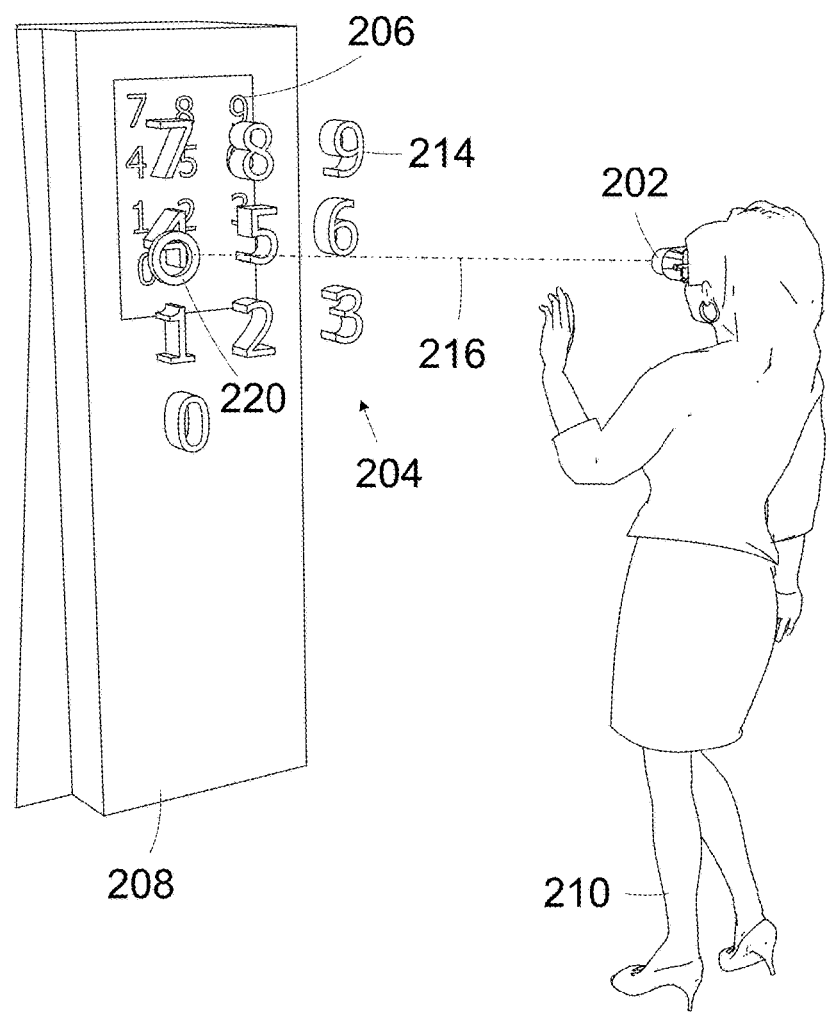

FIG. 4. shows a perspective view of a mid-air elevator eye and hand gesture input panel, and mixed reality MR glasses.

Figure 5:
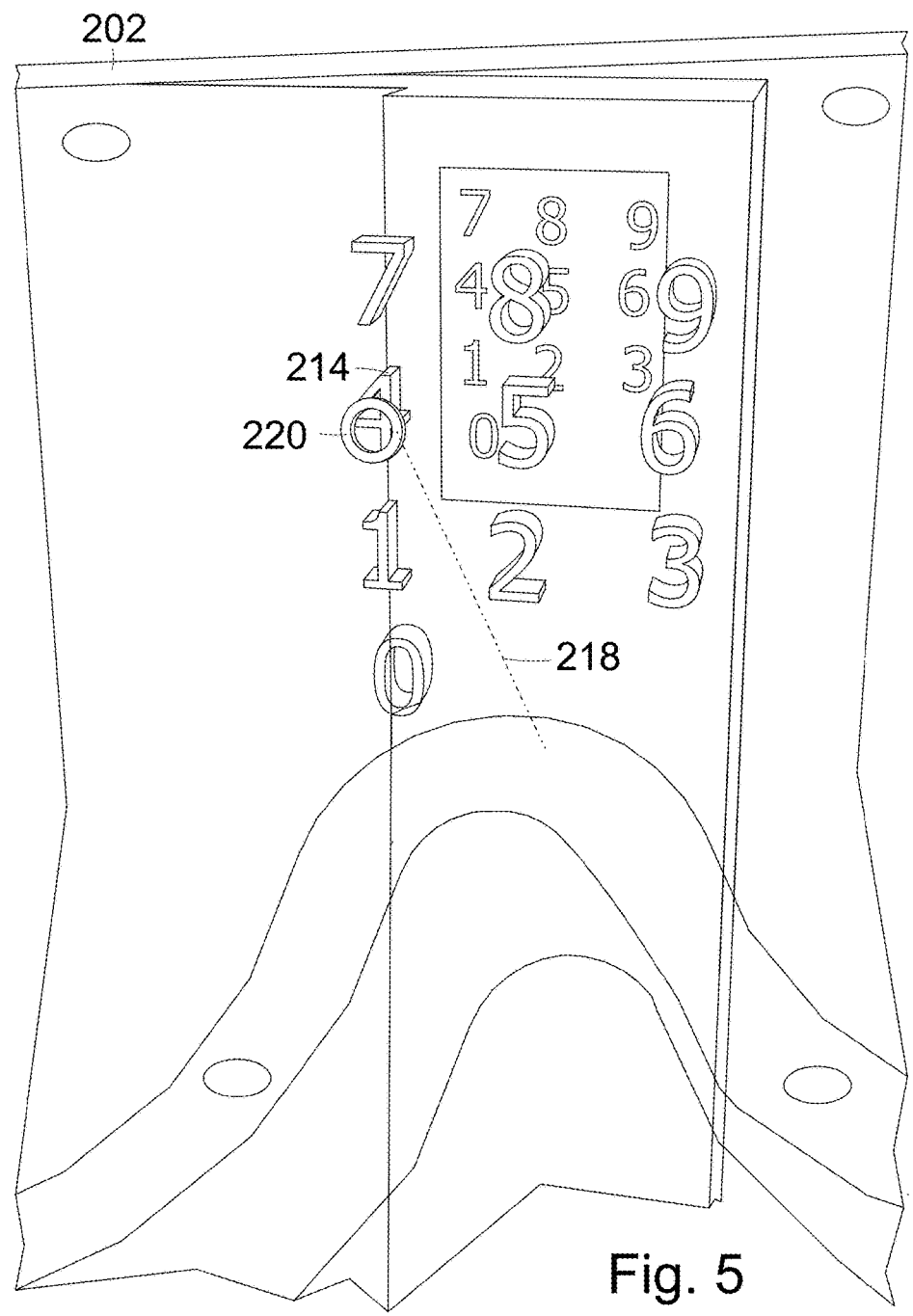

FIG. 5 shows a perspective view of the inside of MR glasses, and a mid-air elevator eye and hand gesture input panel.

Figure 6:
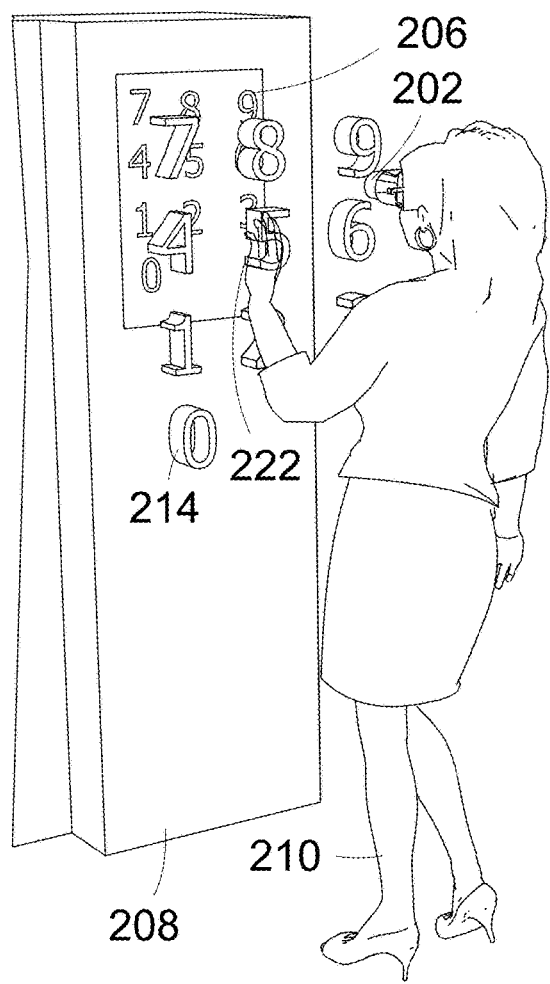

FIG. 6 shows a perspective view of a mid-air elevator touch input panel, and mixed reality MR glasses.

Figure 7:
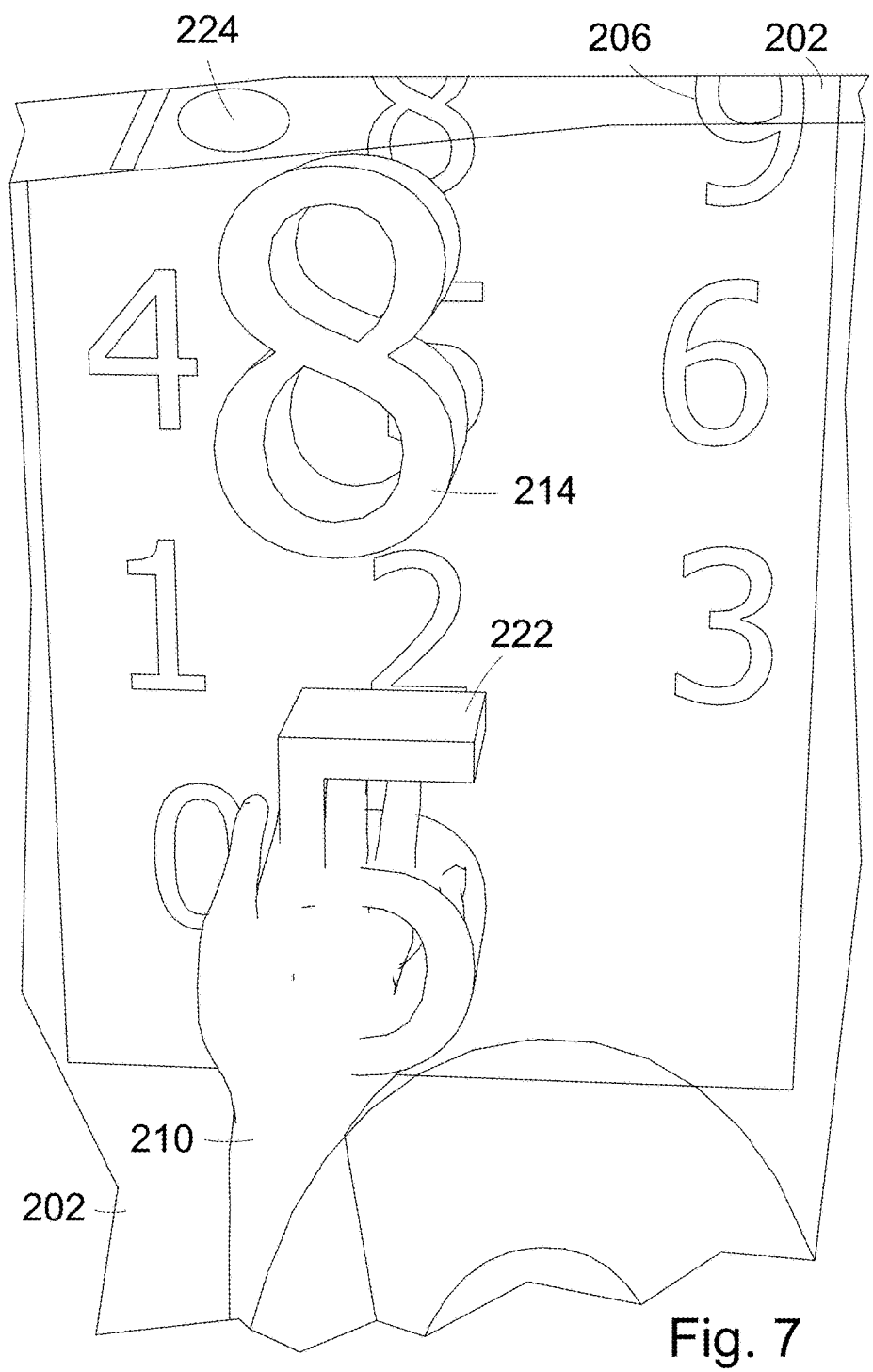

FIG. 7 shows a perspective view of the inside of MR glasses, and a mid-air elevator touch input panel.

Figure 8:
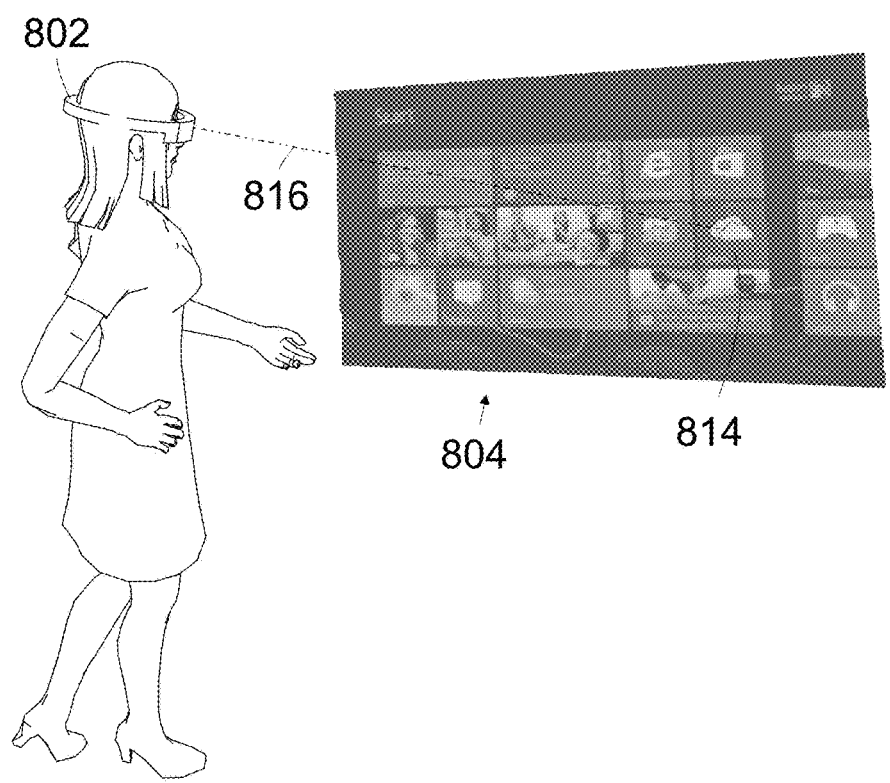

FIG. 8 shows a perspective of view a web page eye tracker input panel, and mixed reality MR glasses.

Figures 9A, 9B:
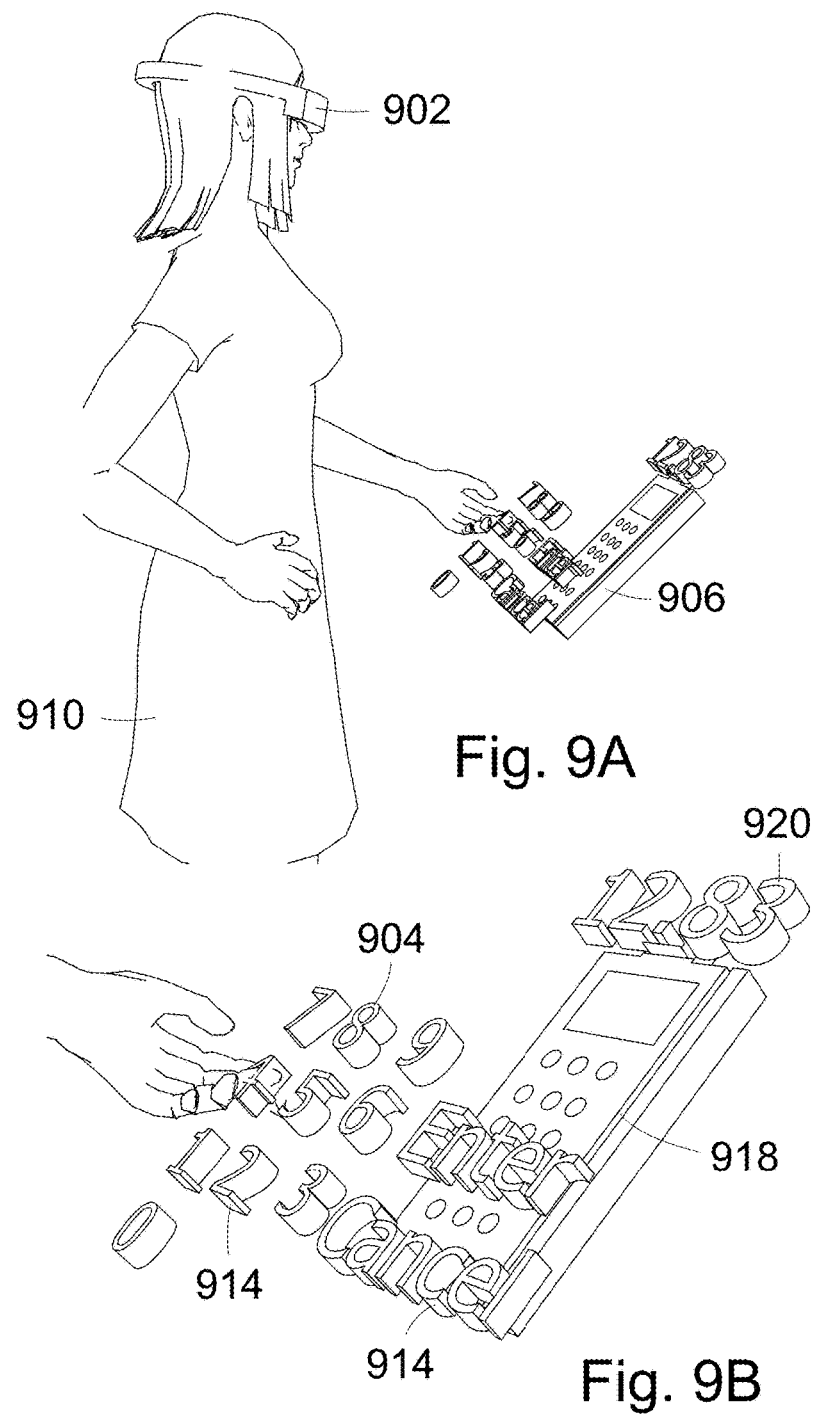

FIGS. 9A and 9B shows a perspective of view a holographic store checkout touch input panel, and mixed reality MR glasses.

Figure 10:
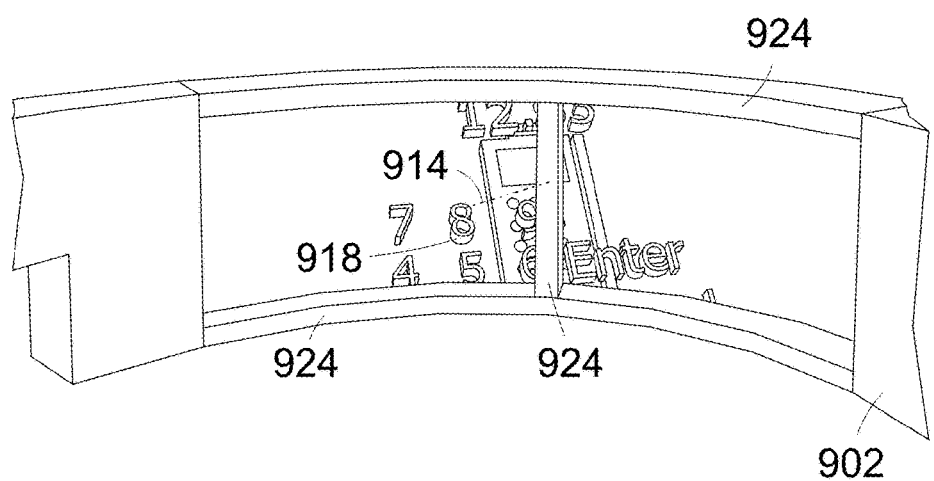

FIG. 10 shows a perspective view of the inside of MR glasses, eye tracker cameras, and a mid-air store checkout eye tracker input panel.

Figure 11:
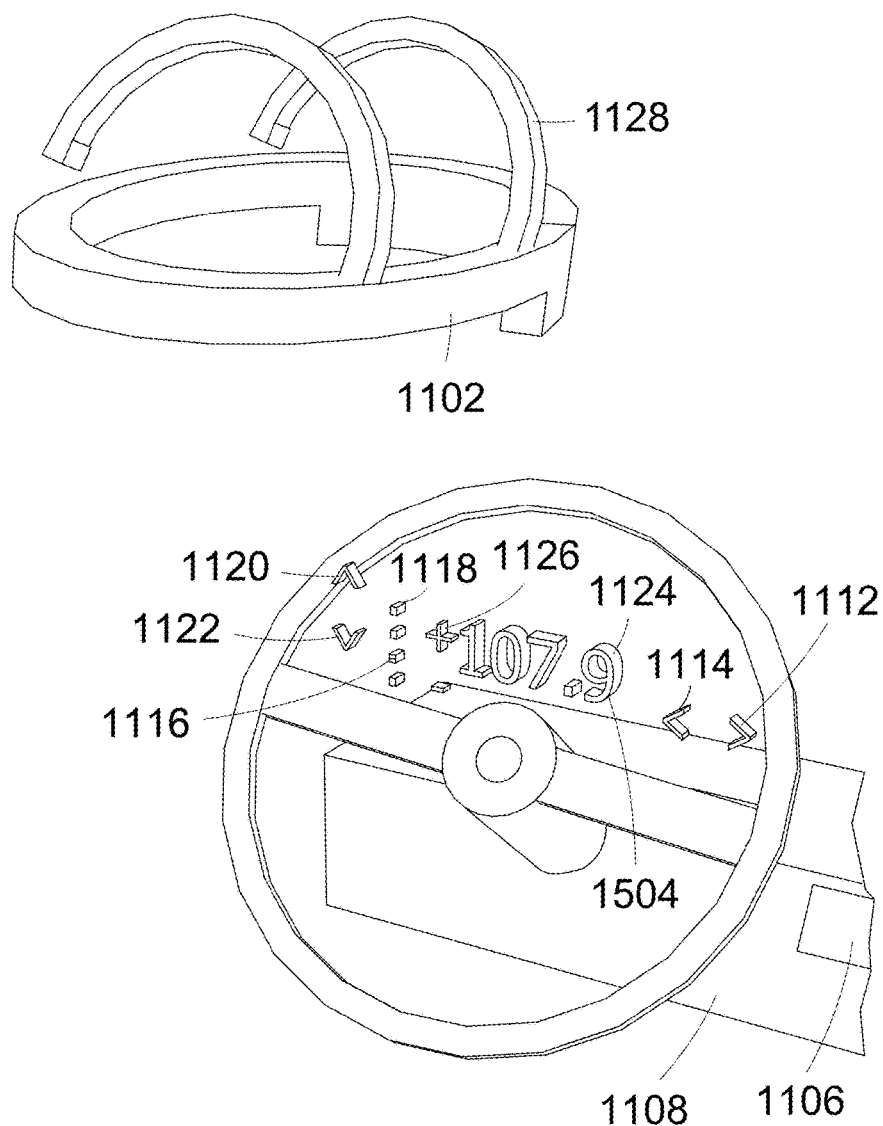

FIG. 11 shows a perspective view of a car thought input panel, and mixed reality MR glasses.

Figure 12:
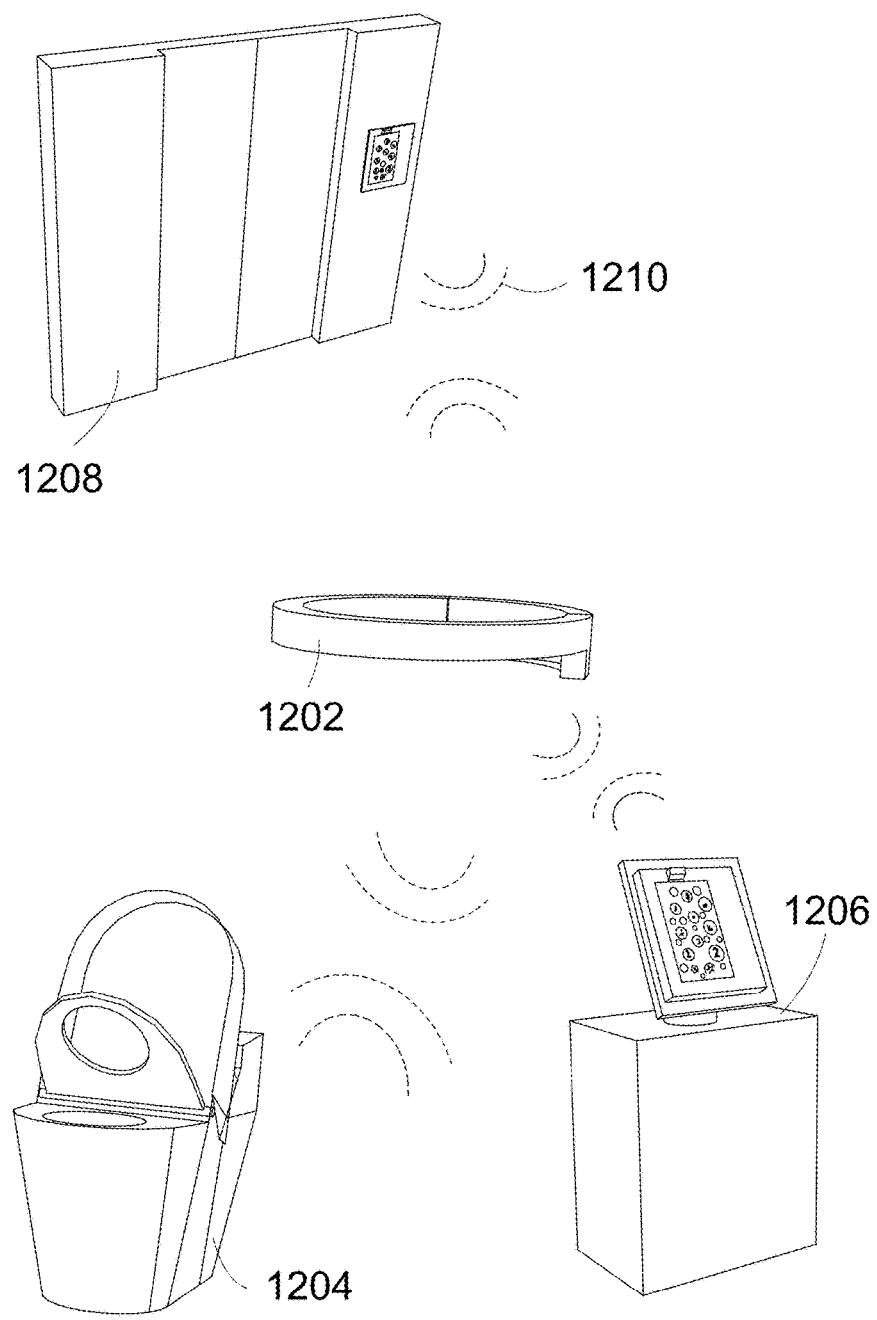

FIG. 12 shows a perspective view of mixed reality MR glasses, connected to many different devices.

Figure 13:
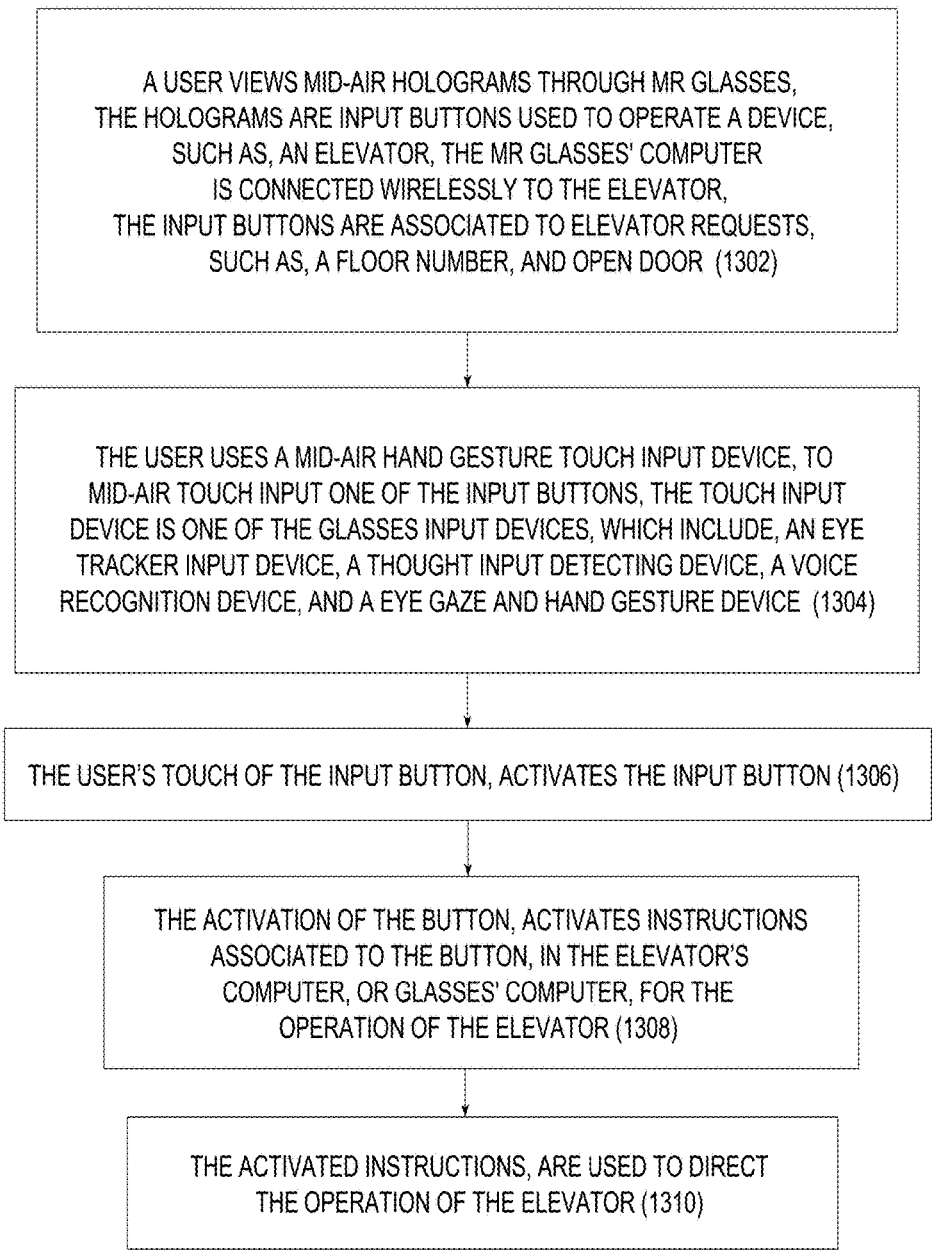

FIG. 13 depicts a flowchart of a MR glasses' operation of external devices.

Figure 14:
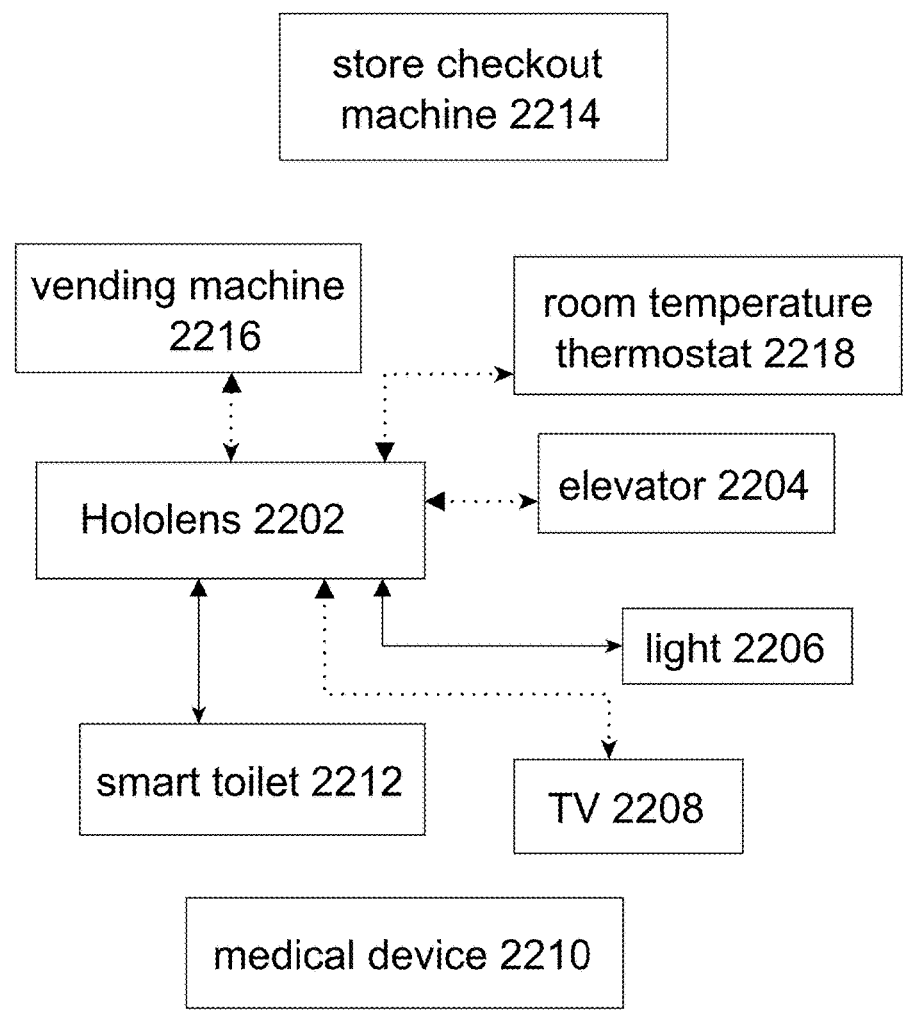

FIG. 14 illustrates a block diagram of hardware confections between MR glasses, and external devices.

Figure 15:
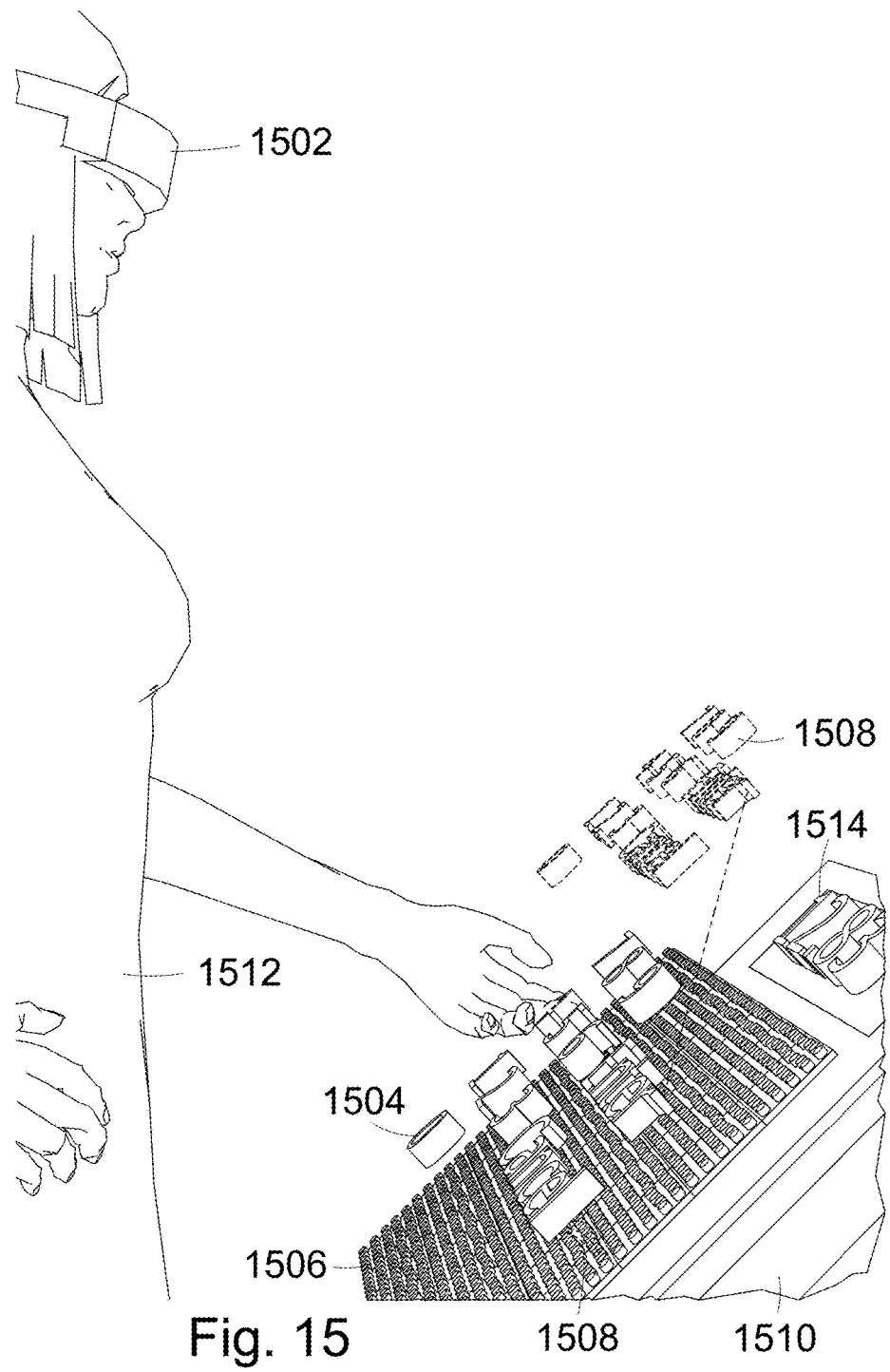

FIG. 15 shows a perspective of view a holographic store checkout touch input panel, mixed reality MR glasses, and a transducer array.

Figure 16:
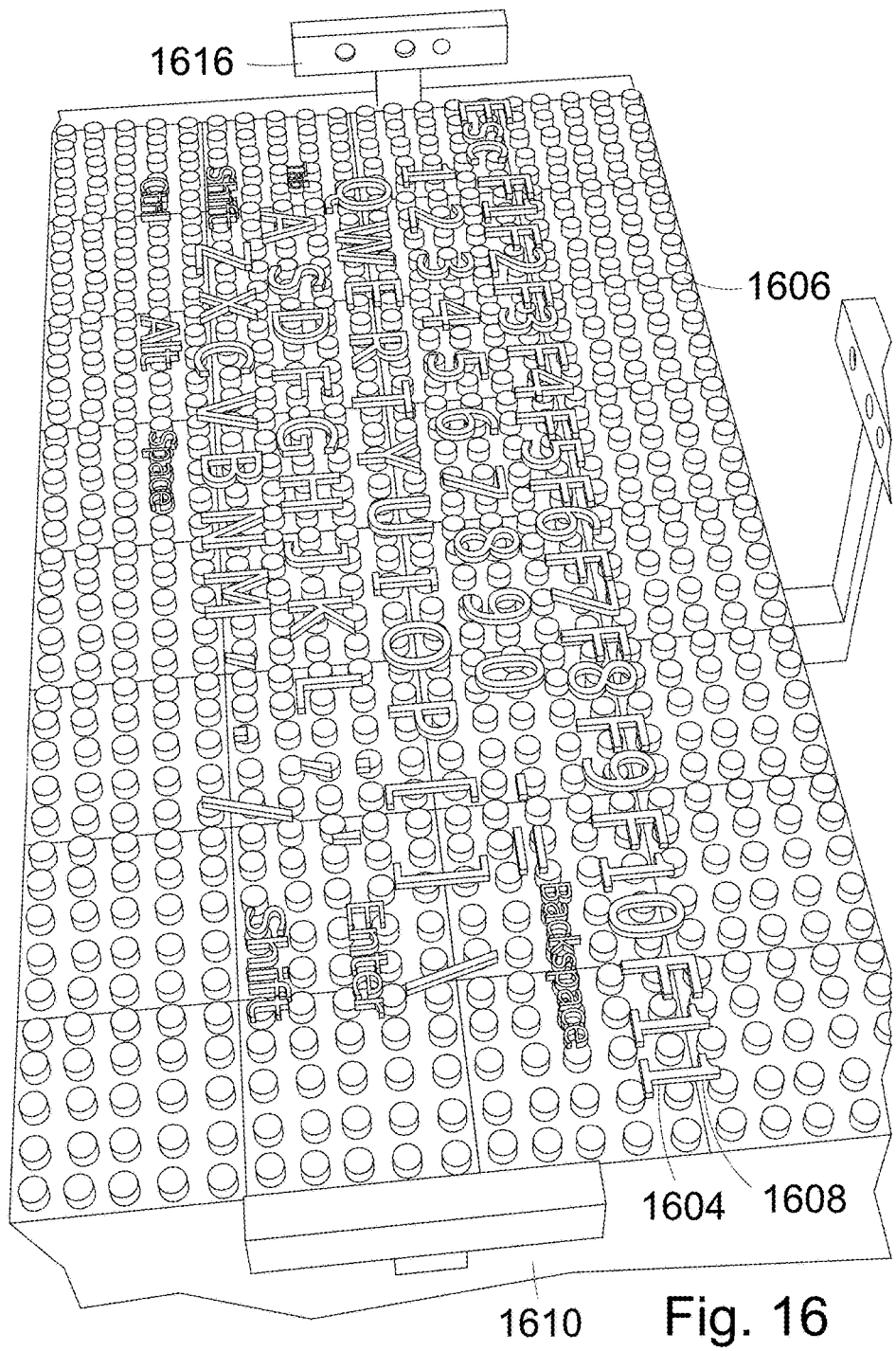

FIG. 16 shows a perspective of view a holographic keyboard, and a transducer array.

Figure 17:
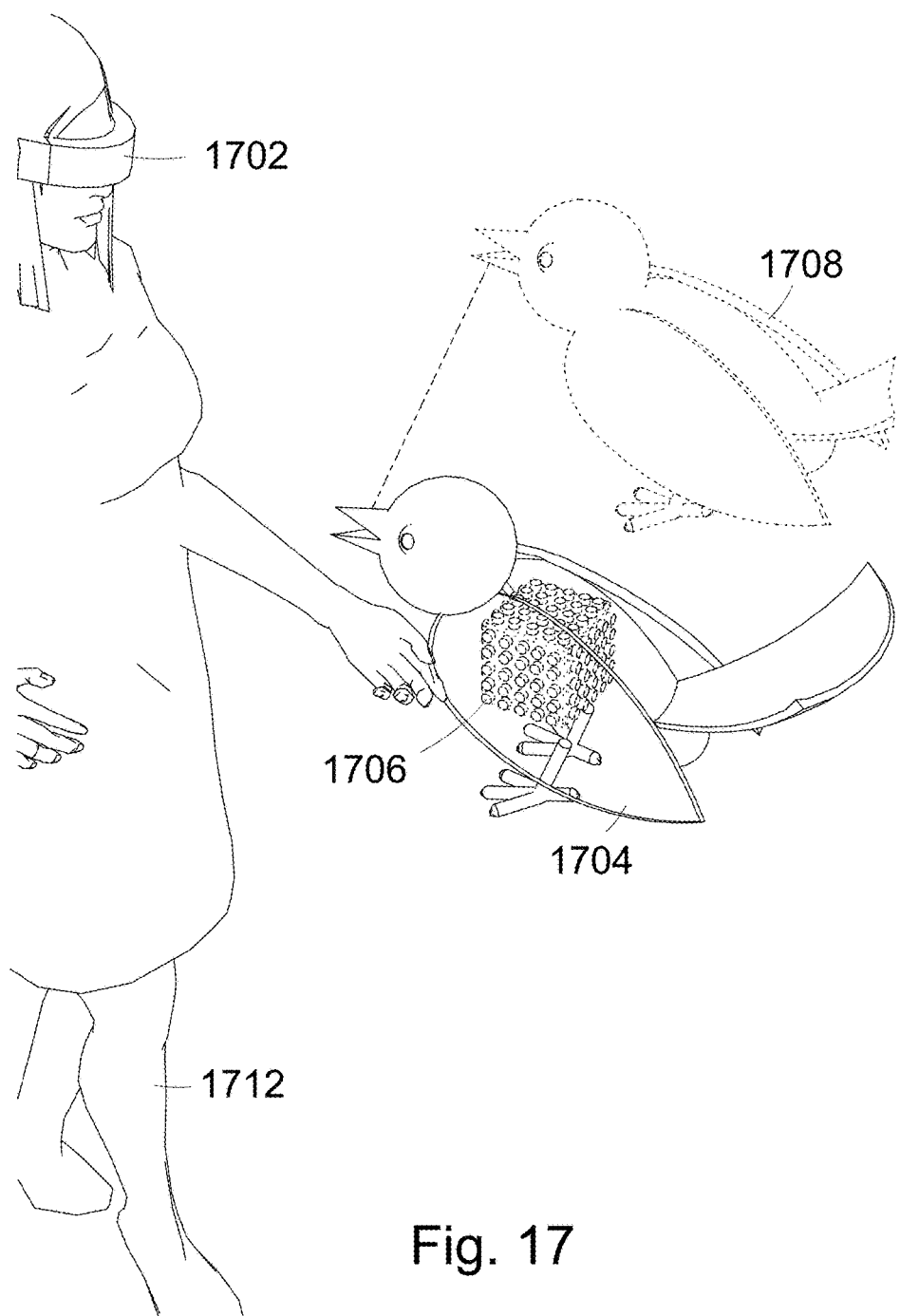

FIG. 17 shows a perspective of view a hologram, a transducer array, and mid-air haptic touch.

Figure 18:
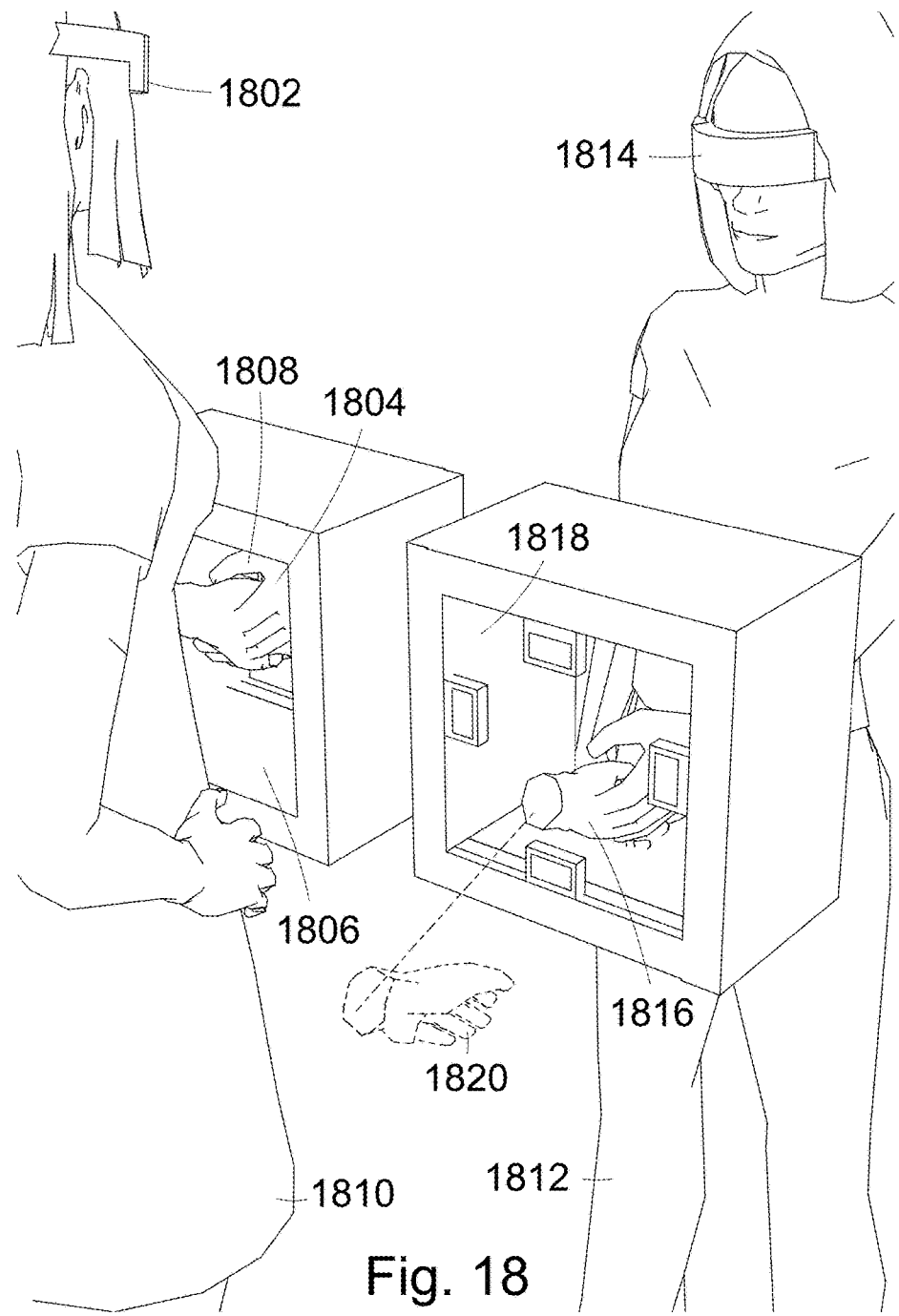

FIG. 18 shows a perspective of view of two transducer arrays, two MR glasses, and mid-air haptic touch.

Figure 19:
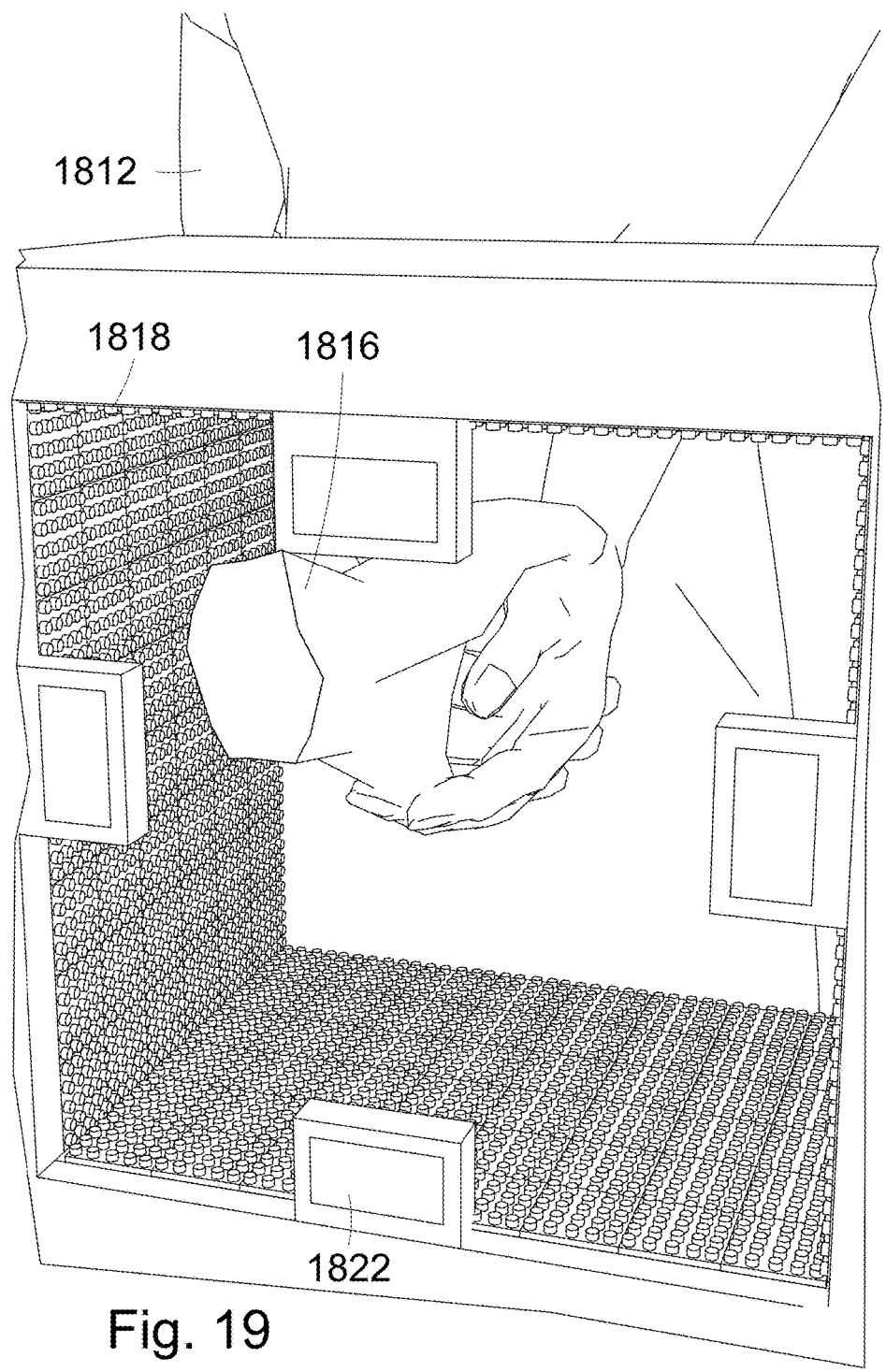

FIG. 19 shows a perspective of view a transducer arrays, MR glasses, and mid-air haptic touch.

Figure 20:
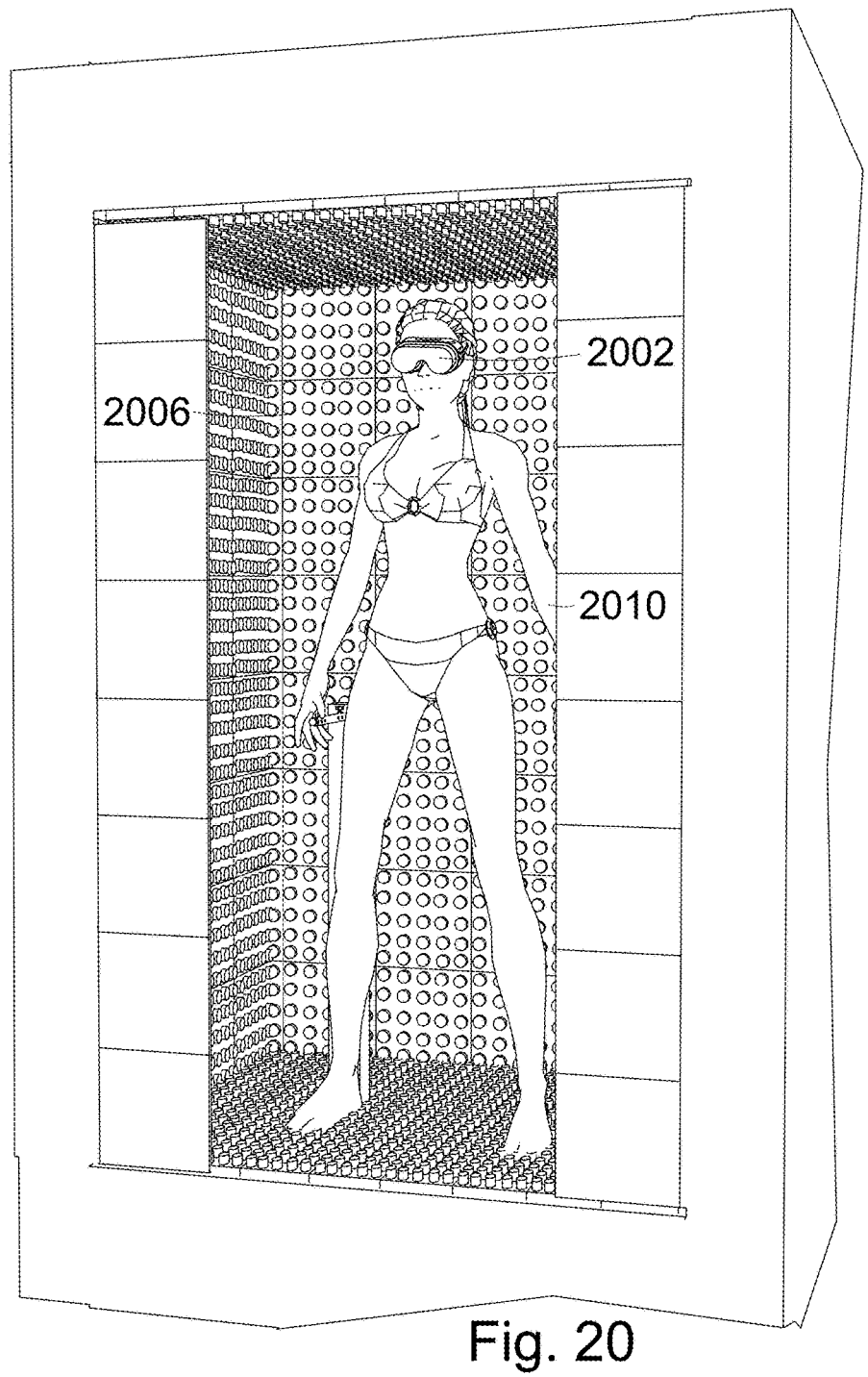

FIG. 20 shows a perspective of view of a full body transducer array, and MR glasses.

Figure 21:
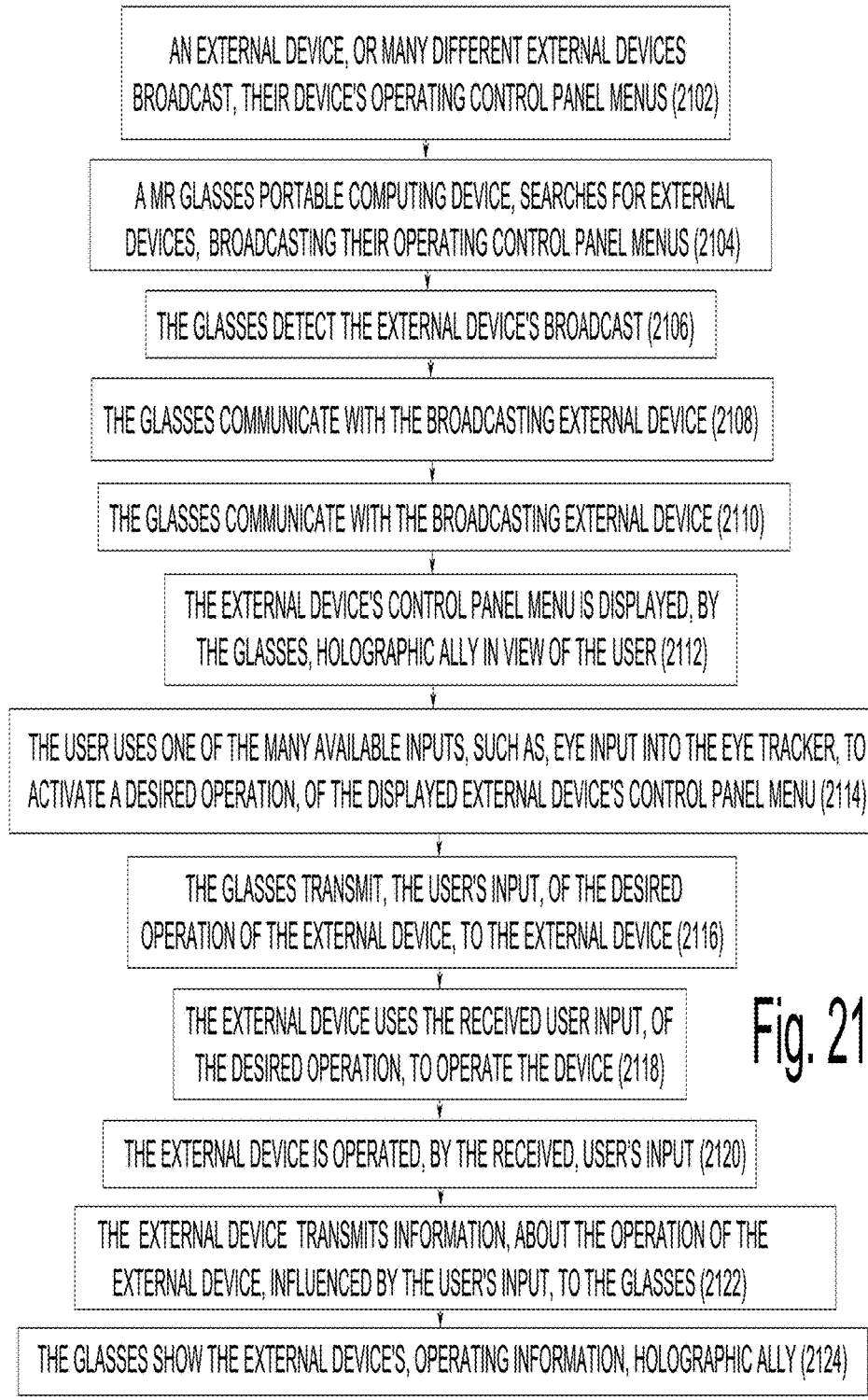

FIG. 21 depicts a flowchart of MR glasses' operation of external devices.

Figure 1:
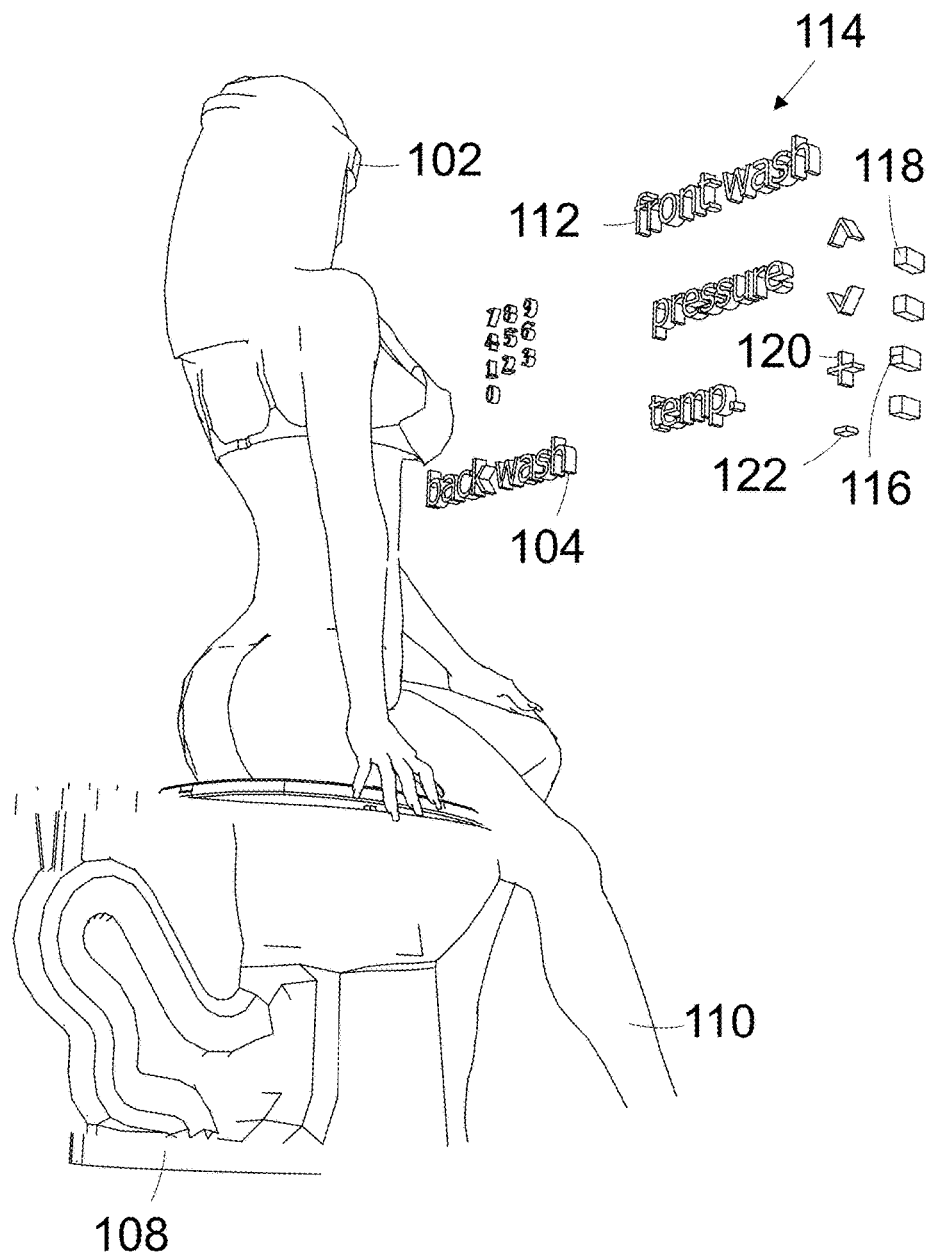
FIG. 1 shows a perspective of view a holographic mid-air smart toilet input control panel, and mixed reality MR glasses.

REFERENCE NUMBERS 102 augmented reality glasses AR, mixed reality glasses MR glasses
104 holographic mid-air touch input display
106 elevator control panel
108 smart toilet
110 user
114 holographic input icons
112 front wash input hologram
116 indicator hologram
118 temperature scale
120 increase hologram
122 decrease hologram,
202 augmented reality glasses AR, mixed reality glasses MR glasses
204 holographic mid-air control panel input display
206 elevator physical display control panel
208 elevator
210 user
212 elevator
214 holographic input command icons
216 eye tracker input
218 eye gaze input
220 cursor
222 touched icon
224 eye tracker input device
226 high lighted icon
802 augmented reality glasses AR, mixed reality glasses MR glasses
804 web page holographic mid-air input display
814 holographic weather icon
816 eye tracker input
902 augmented reality glasses AR, mixed reality glasses MR glasses
904 holographic mid-air control panel input display
906 store payment machine physical display control panel
910 user
914 holographic input command icons
918 credit card reader
920 holographic display
1102 augmented reality glasses AR, mixed reality glasses MR
1104 holographic mid-air control panel input display
1106 radio control panel
1108 car dash board
1112 change car component
1114 holographic input icon
1116 volume indicator hologram
1118 volume scale
1120 increase volume hologram
1122 decrease volume hologram
1124 station indicator
1126 radio change station increase or decrease holograms
1128 additional brain wave sensors
1202 MR glasses
1204 a smart toilet
1206 a space station device
1208 an elevator
1502 MR glasses
1504 holograms
1506 transducers array
1508 mid-air haptic touch
1510 store checkout payment station
1512 user
1514 display holograms
1604 holograms
1606 transducers array
1608 mid-air haptic touch
1610 keyboard
1616 camera
1702 MR glasses
1704 holograms
1706 transducers array
1708 mid-air haptic touch
1712 user
1802 MR glasses
1804 holograms
1806 transducers array
1808 mid-air haptic touch
1810 user
1812 second user
1814 second MR glasses 1816 second holograms
1818 second transducers array
1820 second mid-air haptic touch
1822 cameras
2002 MR glasses
2006 body sized transducer array
2010 user Detailed Description First Embodiment Augmented Reality, or Mixed Reality Glasses Used to Operate to a Smart Toilet Description Viewing Holograms Mixed reality MR, augmented reality AR, and merged reality MR2, is used by glasses, such as, HoloLens glasses, magic leap glasses 102, or intel project alloy glasses, as illustrated in FIG. 1.

The glasses allow a user to view holograms in mid-air in the user's surrounding. The holograms are input buttons used for a device, such as, a smart toilet.

The holograms can move, change shape, and be animated, for example, the hologram can be, a moving, and talking, cartoon character, such, as bugs bunny, or Lisa Simpson. A speaker in the glasses, can broadcast, the characters talking. The is speaker connected, to a computer in the glasses.

The talk, or vocalizations of one of the characters, can describe the input button's function, that the character is associated to, such as, the character can, 1 can increase, or decrease the water temperature'.

The glasses can display, two dimensional 2D pictures, videos, or images in mid-air. The 2D pictures can display information, and can be input buttons, for the smart toilet. For example, one of the 2D buttons for the toilet, may display a start, or stop button.

The Glasses Connecting to the Toilet Wirelessly

The glasses are connected to a blue tooth radio, or WIFI direct transmitter, and receiver, as illustrated in FIG. 1. A smart toilet, having a toilet computer, is connected to a blue tooth, and or Wi-Fi radio transmitter and receiver. The glasses transmitter, and receiver connects, to the smart toilet radio transmitter, and receiver, using radio waves, when the glasses are within 5 meters, or less of the toilet.

The glasses have a camera, which is connected to the computer, to view mid-air hand gestures. The computer is programed, with mid-air hand gesture recognition software. A microphone is part of the glasses, and connected to the computer. Voice recognition software is programmed into the computer, to recognize voice commands by the user. The speaker is connected to the computer, to give the user audio feedback.

MR Glasses

A HoloLens eye input device is part of the glasses, the input allows the user to select, activate, grab, scroll, and interact with their holograms, and let the user, place holograms on real-world surfaces. The glasses can intersect gaze, with the holograms, in a scene, or room, to determine where the user's attention is.

The HoloLens understands gestures, where the user looks, and maps the world around the user, all in real time. The computer can know when the user, is not looking, in the direction of an important object, which can lead a holographic application, to give visual, and audio cues, to turn towards that object.

The user can use a cursor (or other auditory/visual indication) to give the user confidence, in what they're about to interact with. The user can typically position this cursor, in the world where their gaze first interacts an object, which may be a hologram or a real-world surface.

The user can target a hologram, or real-world object using their gaze, their next step is to take action on that object. The primary ways for a user to take action, are through gestures or voice. The holograms appear at an optimal distance of 2 meters. The distance can be changed by the user.

The toilet computer 108 has software operating instructions, for the various functions, and devices of the toilet. The toilet instructions are displayed on a mid-air menu 104, with input able icons 114.

A Tobii eye tracker, is part of, works with, and complement the glasses devices, which include, speech recognition, eye input, and hand recognition. An Emotive company, or Neurosky company though input headset complements, works with, and is part of the glasses. Eye tracking hardware, and software from Eyetracking company can be used.

The input devices can be used in combination, to input, such as, the user can use the Tobii eye tracker to high light an icon, and use the emotive thought headset to activate the icon.

Intel's project alloy, uses cameras on the headset, to view the environment the user is looking at with the headset. The user can only, view their surrounding shown on the headset's display. The headset is equipped with several cameras, that scan the surrounding environment, so that wearers can also interact with real-world objects, when the need arises. This could be climbing stairs or opening a door, for example, or raising a glass to toast with another person. The view, and user interaction is described, as merged reality.

Augmented Reality Glasses Used to Operate to a Smart Toilet Operation

Creating the Input Holograms

The toilet broadcasts, using radio waves, that it is available, to have its control panel menu down loaded, as illustrated in FIG. 1. The glasses receive the broadcast, and downloads the menu. The glasses display the menu 104 in mid-air. The glasses, and toilet are connected wirelessly, and transmit, and receive information with each other.

The user can set the glasses, too automatically, or manually, connect to the toilet. When the glasses connect to the toilet, the display menu for the toilet is transmitted to the glasses. The received toilet control panel menu is displayed, in mid-air, for the user to view and input in to.

Hand Gesture Toilet Input Commands

The user gazes at the icon they want to activate, and the user uses hand gestures, to activate the icon gazed at. The hands are viewable by cameras, in front of the headset. The activated icon sends instructions, to the toilet bidet, to follow a bidet operation, corresponding to the icon.

The user can hand gesture input one of the mid-air input icons, or letters of the mid-air display menu. The computer detects the user's hand gestures, with the camera in the glasses connected to the computer.

The mid-air control panel menu 104, is pinned to a location which is viewable by the user when the user is sitting on the toilet, such as, 1.5 meters in front of the user. The menu 104 can be pinned to a location which is touch accessible, by the user, when the user is sitting on the toilet, such as, 0.5 meters in front of the user. The user views the different input commands 114 for the toilet, such as, increase or decrease 114 water temperature, increase or decrease water pressure, oscillating water spray, water spray pattern, and pulsating water spray.

Different Ways to Input

The user can input using the glasses devices to input, such as, using speech recognition, eye input, eye gaze and hand gesture recognition, hologram touch input, and thought brain wave input.

Eye Tracker Input

The user can input, using eye tracking, one of the mid-air input icons, letters, words, and written phrases, of the mid-air display menu.

The user gazes, with their eyes, at the icon command 114 they want to activate, for a predetermined amount on time, such as, 0.2 seconds. At the 0.2 second time period, the command is clicked, and the icon command is activated. The user can active another command, after the first command is activated, etc. The glasses can, use the HoloLens eye input device, or the Tobii eye gaze tracker, or use Google Magic Leap glasses, to use eye gaze to input an input icon.

Thought Input

The user can use thought to input, one of the mid-air input icons, or letters of the mid-air display menu, by thought inputting one or more of the of the displayed mid-air input icons, or letters.

The user uses mind thoughts, to think about the icon command 114, for a predetermined amount on time, such as, 0.6 seconds, at 0.6 seconds the command is clicked, and the icon is activated. The user can active another icon, after the first icon is activated.

Touch Input

The user can touch input, one of the mid-air input icons, or letters of the mid-air display menu, by touching one or more of the of the displayed mid-air input icons, or letters. The user can use the hand gesture input, of touch, to input one of the mid-air input icons, of the mid-air display menu, by touching with a finger, one or more, of the of the displayed mid-air input icons, or letters.

The user can change the location that the mid-air input display is positioned, or pinned to in mid-air. The display location can be pinned to a location, which is convenient for the user.

Mid-air touch input of one of the holograms 114, by the user's finger, inputs a request to the computer, as illustrated in FIG. 1. The computer directs the smart toilet, to carry out the input request of the user. For example, the user touches a front wash input hologram 112. The front wash input is detected by the sensor and the computer. The computer directs the smart toilet, to start a front wash.

Voice Recognition

The user can verbally input one of the mid-air input icons, or letters of the mid-air display menu, by verbally describing one or more of the displayed mid-air input icons, or letters. Voice recognition detects the icon being described, such as, saying the number 5, activates a number 5 icon. The 5 icon is associated to number 5 word.

Toilet Operations Menu

When a toilet icon is activated, the toilet transmits to the glasses, that the icon is activated. The toilet sends data about the status of the activated device, such as, the time left for the bidet front wash, water stream pressure, or temperature of the water. The data sent from the toilet, is displayed on the mid-air display.

The displayed data keeps the user informed, about the toilets operation, and interaction with the user. The user can use the displayed toilet data, to adjust the operation of the toilet, such as, increasing the time of the front wash, decesasing the waters pressure, decesasing the waters temperature, and changing the oscillating water spray, water spray pattern, and pulsating water spray.

The water pressure can be increased, or decreased, by touching an increase, or decrease hologram. The increased, or decreased of pressure in shown on an indicator hologram on a pressure scale. The pressure of the water is shown on the pressure scale, by indicator lines, shown on one of the pressure indicating holograms. The scale shows from a low to high pressure range.

The water temperature can be increased or decreased, by touching the temperature increase 1420 or decrease hologram 1422. The increased or decreased desired temperature in shown on an indicator hologram 1416 on a temperature scale 1418. The temperature of the water is shown on the temperature scale, by indicator lines 1416, shown on one of the temperature indicating holograms. The scale shows, from a low to high temperature range.

It is implied that all of the described embodiments, of the glasses connected to one of the devices, allows the user to use verbal, mid-air touch input, thought input, eye tracker input, and or eye gaze and hand gesture input, to input into the device that the glasses are connected to device.

The Tobii eye tracker, the Emotiv thought headset, the speech recognition device, eye tracking input device, eye gaze input device, and hand gesture recognition device, are user input devices, which are part of the headset. The input devices in the headset, detect user speech recognition, eye gaze input, eye tracking, thought, and hand gesture recognition. The user input, detected by the devices, is used to operate the toilet.

Some Steps and Means for Operating the Toilet are Described and Summarized

The MR glasses display the mixed reality, and are used to operate the toilet. The user views holograms in mid-air, with the glasses. The glasses have the computer, and the computer is part of the glasses. The computer, has a processor, a storage, and the software. The software has instructions of the operation of the glasses. The software has instructions for the operation of the toilet.

The toilet broadcasts the toilet's operating menu to the glasses. The menu shows the different toilet operations that the user can activate, such as, front wash. The glasses search for a device broadcasting the device's operation menu. The glasses detect the toilet broadcasting of the toilet's operating menu The glasses and the toilet connect to each other. The glasses' download the toilet's menu of operations. The different operations of the toilet, that the user can activate, are displayed as holograms.

The user can identify each hologram by identifying each hologram from each other hologram, by visually having each hologram be different from each other hologram. Each hologram is associated to one of many different operations of the toilet.

Each hologram has instructions for one of the different operations of the toilet associated to the hologram. Each hologram's instructions are different than each other hologram's instructions, The activation of each hologram is associated to one of many different user inputs into the user input device. The user input device is in the glasses. The user input device is connected to the computer. The user input device is located, to receive one of the plurality of different user inputs from the user. The user input devices include, the eye tracker device, the eye gaze and hand gesture device, the thought input device, the voice recognition device, and the finger touch input device.

The user can choose one of the toilet's operations to activate, such as, increase water pressure. The user chooses one of the holograms too active, which is associated to the chosen operation of the toilet. The instructions associated to chosen operation of the toilet, are activated, by activating the hologram associated to the chosen operation of the toilet.

The user inputs into one of the user input devices. The user's input activates the hologram associated to the user's input.

The instructions for the operation of the toilet which are associated to the activated hologram, such as, increase water temperature instructions, are sent to the toilet, with the radio transmitter, and receiver connected to the computer. The radio transmitter, and receiver are part of the glasses.

The toilet receives the instructions sent from the glasses, with the radio transmitter, and receiver connected to the toilet. The toilet has the toilet computer. The toilet computer is connected to the toilet's transmitter, and receiver. The glasses connect to the toilet, when the glasses, are near, or in the vicinity of the toilet, such as, being 4 meters from the toilet.

The toilet uses the received instructions, to affect the operation of the toilet. The toilet uses the instructions to affect the operation of the toilet, and increases the water temperature.

The toilet sends the glasses operating information, or confirmation about the operation of the device, information that the water temperature is being increased. The toilet sends the glasses operating information about the toilet, such as, the water temperature, the estimated time for the water temperature to reach the user inputted water temperature, the pressure of the water pressure, the water spray pattern being used, and the front or back water position.

The glasses can connect to other devices while being connected to the toilet, such as, a bathroom hand dryer, and a vending machine.

The user can operate the toilet sanitarily, by inputting into the glasses touch freely, to operate the toilet. Avoiding touching bacteria, that might be on the toilet's physical touch input surfaces, allows for sanitary operation of the toilet.

Transference of bacteria from a toilet touch control panel is reduced, by using the mid-air menu control panel in influence the operation of the toilet.

MR Glasses Eye Gaze Input Used to Operate a Device Description and Operation

A MR glasses computer is connected to a Tobii eye tracking eye tracker. The eye tracker is positioned inside the glasses to view a user's eyes. A menu of eye gaze inputs, commands is displayed on the glasses mid-air display.

The user can use eye gaze to activate an item. The user gazes at one of the desired displayed items, to be activated, for a certain amount of time. For example, using eye gaze to type letters, or activate an icon, the user gazes at an letter for a predetermined amount on time, such as, for 0.2 seconds, at the 0.2 seconds time period, the letter is clicked, and the letter is activated, or inputted.

One way to activate an item is to look at an item, then look at a control bar, and select, the action they want, such as, click, drop, zoom, etc., activate the click command, and then look at the item to click the item.

The user can input another icon, after the first icon is inputted. The time period of the gaze on an icon, before it inputs, can be changed be the user. The amount of gaze time need to input an icon, can influence the accuracy of the eye activating the icon, the longer the time needed to input an icon, the more accurate the input. The item gazed at, can have, a visual counter, or a visual representation of an analog, or digital clock showing a count down, until the item is clicked.

Eye Tracking Hardware

The eye tracker consists of sensors (camera+projectors) and algorithms. Advanced micro projectors, are used to create a reflection pattern of NIR (Near-Infrared) light on the eyes. The sensors capture high-frame-rate images of the user's eyes and reflection patterns The Image-processing algorithms, the intelligence of the system, which finds specific details in the user's eyes and reflection patterns, and interprets the image stream generated by the sensors. They calculate the user's eyes and gaze point on the glasses screen.

User-Oriented Applications

An intelligent software application layer is added to enable the various ways the technology can be used. The glasses are connected to a device. The user input into the eye tracker is used to operate the device.

The Tobii eye tracker, an Emotiv thought headset, a speech recognition device, eye tracking input device, eye gaze input device, and hand gesture recognition device, are user input devices, which are part of the headset. The input devices in the headset, detect user speech recognition, eye gaze input, eye tracking, thought, and hand gesture recognition. The user's input, is detected by the devices, and is used to operate the device.

MR Glasses Thought Input Description and Operation

A MR Glasses headset computer, is connected to an Emotiv systems, or Neurosky thought input head set, as illustrated FIG. 15. A menu of thought inputs, commands is displayed on the Glasses mid-air display.

The user can use the Emotiv thought head set, to input into the glasses' computer. For thought input, the user views an and icon, and thinks of the icon. The icon being thought about, can be highlighted, showing the user, that they have chosen the icon, to be activated. After a time period, such as, less than 0.5 second of thinking of the item, and the icon is activated. The user can think input, more than one of the mid-air input icons, or letters of the mid-air display menu.

Electrical signals from thoughts in the brain, can also be used to input. For example, when a person moves their tongue, specific electrical signals are created, these signals can be associated to a yes input. When the user moves their tongue, the yes input, is sent to the computer. Other thought inputs, can be associated to other movements of the user's body.

The Tobii eye tracker, an Emotiv thought headset, a speech recognition device, eye tracking input device, eye gaze input device, and hand gesture recognition device, are user input devices, which are part of the headset. The input devices in the headset, detect user speech recognition, eye gaze input, eye tracking, thought, and hand gesture recognition. The user input, detected by the devices, is used to operate a device.

Alternative Embodiments

An Elevator Connected to MR Glasses Description

MR reality glasses 202 are connected to an elevator 208, by radio waves, such as, by blue tooth radio, or a cell phone radio network. as illustrated in FIGS. 2,3,4,5,6, and 7.

The glasses can connect to the elevator, with blue tooth, or WIFI direct radio waves. The glasses can connect to the internet, by using a cell phone network. The elevator can connect to the intent using the cell phone network, or Wi-Fi. The glasses, and elevator can communicate with each other over the internet.

The glasses can connect to the elevator through a smart phone, by the glasses using a Bluetooth connection to the phone, the phone being connected to a cellphone radio network, and internet. The phone connected to the elevator over the internet. A computer 202 is part of the glasses 202.

Various augmented reality AR glasses made by various companies can be used, such as, Sony SmartEyeglass, Epson Moverio BT-200, Vuzix M100 Smart Glasses, Meta 2, Recon Jet, Optivent Ora-1, GlassUp, and Osterhout design group R-7.

Elevator control panels (not shown) outside the elevator, which are on different floors, each have, and are connected to a blue tooth, cell phone or Wi-Fi direct radio transmitter and receiver. The control panels connect to one, or more elevator computers. The elevator computer directs the operation of the elevator.

The elevator has a holographic call up or down button, and physical call buttons, located outside of the elevator, on a floor that the elevator doors opens to. To call the elevator, the user activates either the up or down button, with one of the input devices in the glasses.

A physical control panel 206, and holographic control panel is located inside the elevator. The panel is connected to a blue tooth, or Wi-Fi direct radio transmitter, and receiver. The glasses 202 connect, using radio waves, to the elevator radio transmitter and receiver, when the glasses are within 5 meters or more of the elevator.

Hand Gesture Input

A mid-air hand gesture camera, and or sensor 202, is connected to the headset, and computer. Hand Gesture Input as illustrated in FIGS. 4, and 5, uses a user's eye gaze 218 and hand gestures, or air tap to activate a holographic input icon 214. Air tap, along with gaze, is used to select holographic applications APPS 214.

Gaze at a Hologram

The user holds their hand straight out in front of them, in a loose fist, then points their index finger straight up toward the ceiling. There's no need to raise their whole arm, they can keep their elbow low and comfortable. The user taps their finger down, then quickly raise it back up again.

Gaze

The user uses their gaze to move a cursor 220 and highlight apps and other holograms for selection.

Select

To select a hologram, button, or another element, gaze at it, then click.

Tap and Hold

To tap and hold, start with an air tap, but keep their finger down instead of raising it back up again.

Use tap and hold to scroll. On the app bar, select Scroll Tool. Tap and hold until the tool appears, then slowly move their hand up and down or side to side. To scroll faster, move your hand farther from the center of the tool.

Drag

On the app bar, select Drag Tool. Tap and hold until the tool appears, then slowly move their hand up and down or side to side.

Zoom

On the app bar, select Zoom Tool, then tap and hold until the tool appears. Slide their hand up to zoom in and down to zoom out.

Pin, Unpin, or Uninstall an Application

Tap and hold an app tile on Start or in the All apps list, then select one of the menu choices.

Resize an App

On the app bar, select Adjust. Tap and hold one of the blue squares in the corners of the app window, then move their hand to resize.

Move an App

On the app bar, select Adjust. Continue gazing at the app window, then move their hand to position the app hologram.

A Second Camera for Hand Gesture Input

A second hand mid-air hand gesture camera, and or sensor 202, is connected to the headset, and computer The second gesture camera, detects the user's touch of one of the input icons, with the user's finger as illustrated in FIGS. 6, and 7. The touch of the hologram activates the hologram.

Voice Input Commands

The user can verbally input one of the mid-air input icons, or letters of the mid-air display menu, by verbally describing the icon to be inputted. The computer detects the user's voice, with the microphone in the headset. The microphone 202 is connected to the computer, and the speaker 202 in the headset 202 give audio feedback. The HoloLens can display commands. To see more commands, the user can say "what can I say?"

Select

Use this instead of air tap. Gaze at a hologram, then say "Select. "Place. Instead of air tapping to place a hologram, say "Place. "Face me. Gaze at a hologram, then say "Face me" to turn it toward the user. Bigger/Smaller. Gaze at a hologram, then say "Bigger" or "Smaller" to resize it For example, the user wants to activate the 4 number floor button. The user says, the number 4. The voice recognition software detects the word four. The computer is aware, of the different numbered input buttons. The number 4 button is activated.

The number four button can also be activated by the user, moving a holographic curser to the number for with the input of their eyes. When the cursor touches, or overlays the number four. The user can activate what the cursor is touching. The user can say activate, or yes, and the number four button is activated. The computer is aware that the cursor is touching the number four button.

Eye Tracker Input

Figure 2:
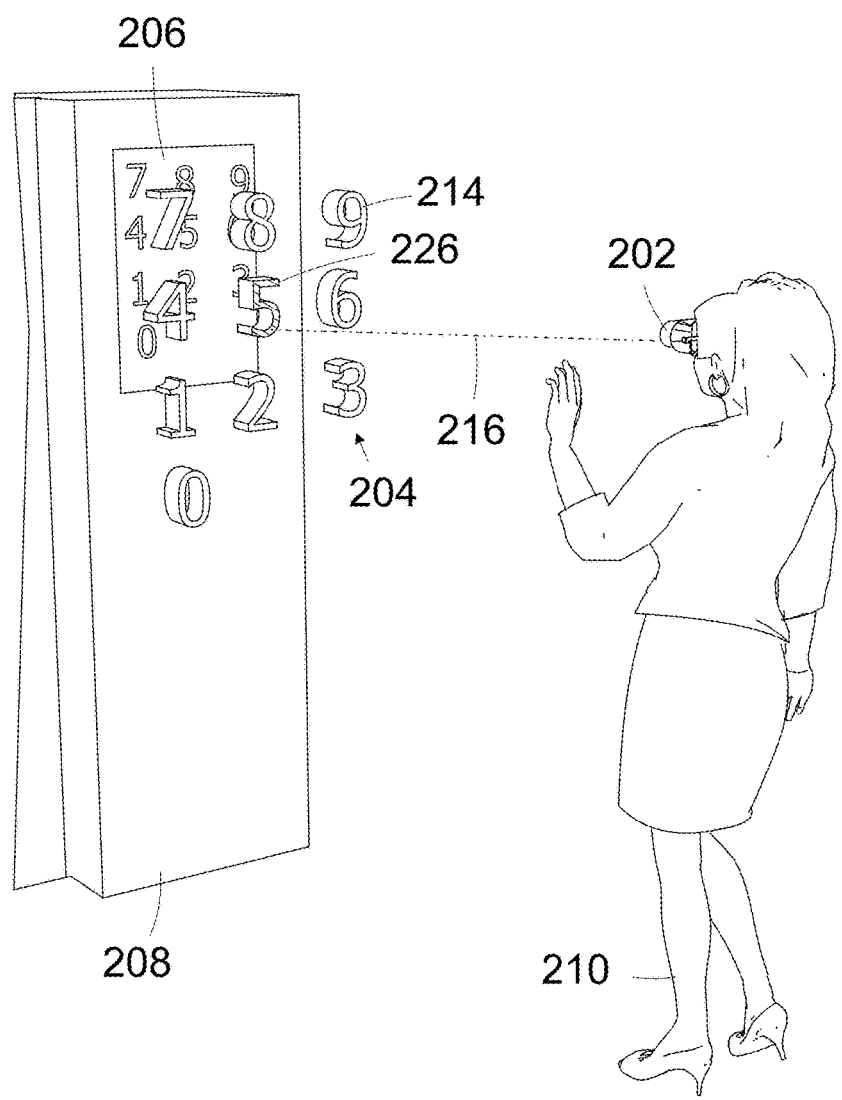
FIG. 2 shows a perspective of view a mid-air elevator eye tracker input panel, and mixed reality MR glasses.
Figure 3:
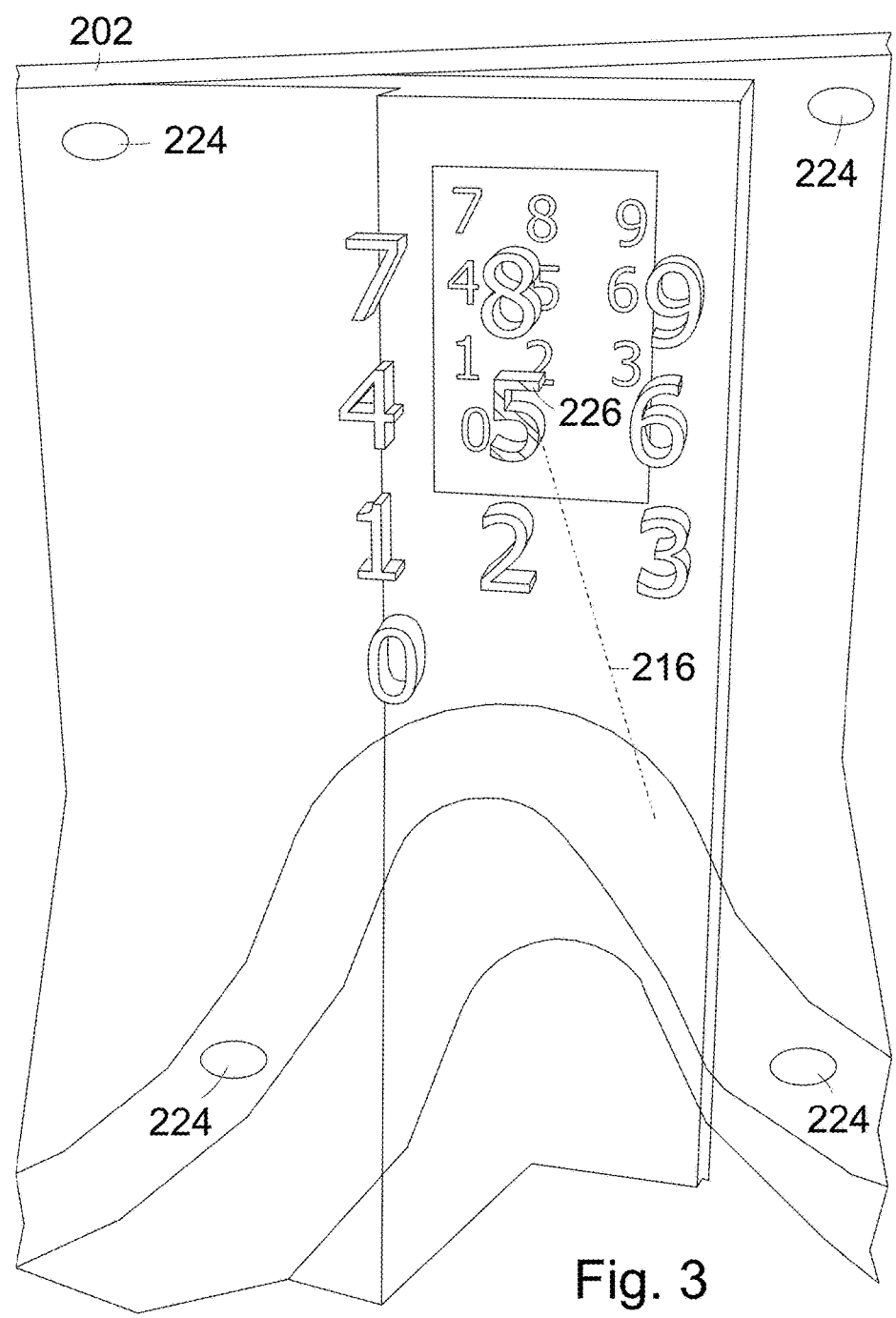
FIG. 3 shows a perspective view of the inside of MR glasses, and a mid-air elevator eye tracker input panel.

A Tobii eye tracker 224, is connected to the computer, as illustrated in FIGS. 2, and 3. an Emotiv thought headset 202 is connected to the computer, as illustrated in FIG. 2.

The Tobii eye tracker, the Emotiv thought headset, the speech recognition device, the eye input device, and the hand gesture recognition device, in the headset, are used to detect user input. The detected input, is used to operate the elevator.

Different Input Used Together

Different inputs can be used together, too active an input icon, for example, the user can highlight an input icon with their thoughts, and activate to icon by gazing at the icon with their eyes.

Multiple combinations can be used, such as, a sequence using thought, to chose a menu of devices to input, eye tracker input, to chose the device to input, and mid-air touch input, to activate one of the desired input button of the device. The different inputs can use, eye tracker input, eye gaze and hand gesture, though input, voice recognition, and mid-air hologram touch.

Icons Give Visual Feedback

The icons give visual feedback, that they have been touched. The icons give visual feedback, that they have been activated, such as, changing color, dimming, changing shape, moving, decreasing in size, moving farther away from the user, and showing text The icons can change, color, or size, when being activated, or touched.

The input icons can be visually pleasing, such as, being similar to a rabbit, a flower, and a person's face. The user can set, and input the shape, avatars, movements, activation actions, and colors used for the buttons.

Sound Feedback

Sound can be associated to the touch of each icon, such as, a bell note, music, a cat's meow, and a chime. Sound can be associated to the activation of the input, such as, a piano note. The sound is broadcast, from the speaker in the headset.

The sound lets the user know that they have touched, and or activated the icon. The user can set, and input the sounds associated to the icons Augmented Reality, and Mixed Reality Augmented reality, and Mixed reality is a live, direct or indirect, view of a physical, real-world environment whose elements are augmented by computer-generated sensory input such as sound, video, graphics or Global Positioning System GPS data. It is related to a more general concept, called mediated reality, in which a view of reality is modified (possibly even diminished rather than augmented) by the computer.

As a result, the technology functions by enhancing one's current perception of reality. By contrast, virtual reality replaces the real world with a simulated one. Augmentation is conventionally in real-time, and in semantic context with environmental elements, such as sports scores on TV during a match.

With the help of advanced AR technology (e.g. adding computer vision and object recognition) the information about the surrounding real world of the user becomes interactive and digitally. Artificial information about the environment, and its objects can be overlaid on the real world.

Augmented reality glasses are AR displays which can be rendered on devices resembling eyeglasses. Versions include eyewear that employ cameras to intercept the real world view and re-display its augmented view, through the eye pieces, and devices in which the AR imagery is projected through or reflected off the surfaces of the eyewear lens piece.

The AR glasses headset allow the user to see holographic objects superimposed on their surroundings, and also view their surroundings. The user looks though the glasses lens, and views the holographic objects displayed on the lens. The images on the lens give the visual illusion, that the objects are in three-dimensional space, located in the area around the user, such as, in a room.

The Glasses Computer can be Used to Store Software

The glasses can keep and store the software which was downloaded from the device, to use with the device the next time the device is operated. The device can have a unique identifier, which is associated to its operating software, the identity can be used for the glasses to identify the device, and use the stored software for the operation of the device. The software can be stored in a profile of user settings, which are associated with the user, and or the elevator.

The Glasses Computer can be Used as the Elevator's Computer

The computer in the glasses, can be used as the computer, which is used to operate the elevator. Other devices that the glasses computer may operate include, smart toilets, and automatic teller machines ATMs. User inputs into the ATM, may include, login pin number, deposit input, withdraw input, checking account selection, and menu, inputted by the user, the computer in the glasses connects to the device, and is programmed with software for the device it operates.

The glasses computer can have preprogramed software to operate different devices, such as, elevators, vending machines, medical device, and self-serve gas pumps.

The vending machine can display holographic ally, using the glasses, a menu of user inputs. The user can input menu items, using the input devices, inputs including, item selection, and enter. The self-serve gas pump can display holographic ally, using the glasses, a menu of user inputs. The user can input menu items, using the input devices. Inputs include, gasoline grade selection, diesel, credit card payment, and enter.

The medical device, may be, a blood pressure measuring device, or computer, and can display holographic ally, using the glasses, a menu of user inputs. The user can input menu items, using the input devices, inputs include, item selection, memory, start, stop, and enter.

The software for the devices can be standardised. The preprogrammed software allows the glasses', to have the devices operating software, without having to download it from the device.

Connection to the Internet

The glasses can connect to the elevator over the internet. The glasses, and the elevator connect to the internet. The glasses know the elevator's location, and the elevator knows the glasses location, by sharing their GPS location. The glasses', and elevator each have a GPS sensor, which receives GPS location information.

Glasses Communicating with the Elevator

The elevator broadcasts, that it's operating menu is available for download. When the user looks at, or is near the elevator, the glasses ask the device for its operating control panel. The device sends the device's operating menu to the glasses. The devices operating input menu will be displayed, on the glasses. The menu can stay pinned, to a position associated with the device, such as, near the device. The menu is displayed on the glasses lens, and gives the user the illusion that a holographic menu is floating in mid-air.

User Input to Operate the Elevator

The user inputs an icon 214 of the displayed holographic menu 204, by using mid-air hand gestures, or vocal commands, to activate a chosen input icon of the menu. The glasses allow the user to operate devices, without touching them. The devices and the glasses communicate wirelessly, with Bluetooth, or direct WIFI.

Positioning the Holographic Input Buttons within the Elevator

The glasses headset 202 maps, the inside of the elevator. The device displays the holographic control panel 204, which operates the device, 1 meter from the devices physical elevator control panel 206. The user can change, and set the distance, that the control panel is from the devices physical control panel.

The holographic control panel 204 can be operated, independently of the devices location, for example, an elevator call control panel 204, can be operated 5 meters from the elevator control panel, and out of view of the physical control panel 206. The user 210 can call the elevator, using the holographic call panel. Some devices could rely solely on the holographic panel for operation, without having a physical touch screen input control panel 206.

Many devices holographic menu can be displayed, in the same room, in close proximity to each other, such as, displaying a vending machine menu, an elevator call button, and an automatic teller machine.

The inside of the elevator, and outside elevator input panel has software operating instructions, for the various functions and devices of the elevator. The elevator instructions are displayed on a mid-air menu by the glasses 202.

Communicate Distance Between the Glasses with the Elevator

The user 210 can set the distance, that the glasses computer detects external devices, that can operated by the user. Limiting the distance, may limit the distance that the user needs to travel to a device. Limiting the number of devices detected, might be used to filter out too many available choices. The devices connection range to the portable computer may be limited, by the radio range of the transmitter. The location of the device may limit the devices broadcast range, for example, when the mobile device located on a train.

Glasses Connecting to Multiple Devices

The glasses computer can connect to more than one device at a time, and show the displayed devices, and operate the devices. The portable computer can connect and operate many devices, such as, a gas pump, a medical device, a store checkout station, a smart toilet, an elevator, a vending machine, a ATM, a flammable environment device, a door lock, a car lock, a car ignition, a room temperature thermostat, a television TV, apartment lights, and a microwave oven.

The glasses can operate, the flammable environment device, may operate a gas compressor's, on off switch. the door lock's, lock or unlocked switch. the car lock's, lock or unlocked switch. the car ignition's, start or accessory setting switch. the room temperature thermostat's, increase, or decrease thermostat temperature switch. the apartment light's on or off switch. the microwave oven', on or off switch, an oven operation timer setting, and a temperate setting. the TV's on or off switch, channel number, channel selection, record, pause, sound volume increases or decrease, picture source selection from DVD, or computer, and picture settings.

The glasses can operate medical devices may include, a blood pressure machine, an x-ray machine on off switch, keyboards in a hospital, touch screen displays in a medical environment, an electric hospital bed having a raise or lower bed switch, and hospital TV remote controls for changing the TV channel.

The glasses can operate, more than one device at a time. Two device operating menus, can be shown on the display. The user can input into the operating menus simultaneously, such as, the user can operate a vending machine, while operating the room lights.

The glasses can operate devices made from differing companies, and differing styles of devices. The glasses can operate elevators made from differing companies, and differing styles of elevator. The elevator communicates with the glasses computer. The elevator downloads the elevator operating menu to the glasses. The glasses computer is able to operate the elevator, by using the user's input of the elevator operating menu, on the glasses display.

Along with displaying the user's devices, the user may receive and show devices from other users, such as, the other user's desktop printer. The other users could be deleted for the menu of available devices, so that they don't appear on the users display. Unwanted devices shown on the display can be removed.

With many devices displayed, the user may scroll or page thru the available devices. The glasses can connect to a portable computer, and use the portable computer to, connect to and operate external devices. The user's devices can be password protected, to enable only the user's glasses computer to operate their devices.

More Possible Devices Operated by the Glasses

In an apartment, office building or house the available controllable devices would be displayed on the glasses' display, such as lights, TV, radio, dishwasher, stove, and microwave oven. The apartment devices can be operated using the glasses r. The glasses, can find a car in a parking lot, unlock the doors, and start or stop the car's engine. Devices in an industrial work environment can be operated by the glasses, such as, a milling machine, lathe, press, or airplane control panel.

The glasses can operate multi user devices such as, house lights, house door bell, office door locks, house door locks, car door locks. The devices can be programmed to allow only certain users to operate the device, such as, only employees in an office would be allowed to operate an office printer. For example, only certain users would be able to operate a hospital x-ray machine. The portable computer controls lights in apartments, office rooms, interior, and exterior lights.

Communicating with Other Users Glasses

The glasses can be set to detect other users, with glasses. The users can also broadcast too other user's glasses that they are available to communicate with other users, using the glasses.

Communicating users can each see, an avatar of the other user, in mid-air holographic ally, that moves similar to the user broadcasting the avatar. The users can each broadcast their voice, and hear the voice broadcasts of the other user.

Storage

Computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

The computer may further include on-board data storage, such as, memory coupled to the processor. The memory may store software that can be accessed and executed by the processor, for example. The host may be any type of computing device or transmitter including a laptop computer, a mobile telephone, that is configured to transmit data to the device. The host and the device may contain hardware to enable the communication link, such as processors, transmitters, receivers, antennas.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

Communication Links

The MR glasses computer may connect to the elevator, locally, over a network, or at a distant location over the internet. The MR glasses may be connected to a quantum cloud computer, to enable quantum cloud computing.

The glasses, and elevator may each have a cell tower radio wave receiver, and transmitter, similar to a smart phone tower receiver, and transmitter. The tower receiver, and transmitter connect directly to cell phone tower receiver, and transmitter. The connection between the glasses and the tower allow the glasses to access the cell phone network, and connect to the elevator Access to the networks allow the glasses to access data transfer from the network, access the internet, receive information from internet web pages, and allow the user to view, and send information to webpages. The user can also make phone calls, video chat calls over the cell network, and internet.

The communication link is illustrated as a wireless connection; however wired connections may also be used. For example, the communication link may be a wired link via a serial bus such as USB, or a parallel bus. A wired connection may be a proprietary connection as well. The communication link may also be a wireless connection, such as Bluetooth, IEEE 802.11 or wireless based communication links. In another example, the system includes an access point through which the glasses, and elevator may each communicate with the internet. In this example, the glasses, and elevator may not require connectivity to the host.

The access point may take various forms. For example, if the glasses, and elevator may each connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the glasses, and elevator each may include a wired or wireless network interface through which they can connect to the access point. As an example, the device may be configured to connect to access point using one or more protocols such as 802.11, 802.16 (WiMAX), LTE, GSM, GPRS, CDMA, EV-DO, and/or HSPDA, wave2 Wi-Fi, Light Fidelity Lifi, Multi-User Multi-Input Multi-Output MU-MIMO, LTE-U, and Wi-Fi direct, among others.

Furthermore, the glasses, and elevator each may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, they may access the internet through the host.

The glasses can have a light transmitter and light receiver in the glasses, which is connected to the glasses computer. The elevator can have a light transmitter, and light receiver connected to the elevator computer, could be used to allow the glasses, and elevator to communicate. The glasses", and elevator's light transmitter, and light receiver, can use light to wirelessly transmit data to each other. Different light can be used for communication, such as, infrared light, laser light, light emitting diode light, visible light, and Light Fidelity (Li-Fi) visible light.

Programming

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

An Intel perceptual computing software developer's kit could be used to build applications for the smart toilet applications. The Microsoft Software Developers Kit can be used build elevator function applications. The computer may run a Linux operating system, Android operating system, an apple operating system, or another operating system.

Various programming languages can be used to program the computer 106, such as, C++, C#, Java, PHP, JavaScript, Python, Objective-C, Ruby, Perl, Microsoft Visual Studio Ultimate, Microsoft Visual Programming Language, Microsoft NET, XNA, Silverlight, and Visual Basic. Unity can be used to build applications for the HoloLens.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The object detection and selection mechanism is described below with reference to flowchart illustrations and or block diagrams of methods, apparatus (systems) and computer program products according to implementations thereof. It will be understood that each block of the flowchart illustrations, FIGS. 13 and 21, and or block diagrams, and combinations of blocks in the flowchart illustrations and/or block diagrams, can be implemented or supported by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Operational Software Flowchart

Software steps of the glasses portable computer and external device's operation, may include some of the following steps In the device software and operation flowchart the following steps illustrate the glasses and external device's operation, as shown in FIG. 13, a user views mid-air holograms through MR glasses, the holograms are input buttons used to operate a device, such as, an elevator, the glasses' computer is connected wirelessly to the elevator, the input buttons are associated to elevator requests, such as, a floor number, and open door (1302), the user uses a mid-air hand gesture touch input device, to mid-air touch input one of the input buttons, the touch input device is one of the glasses input devices, which include, an eye tracker input device, a thought input detecting device, a voice recognition device, and a eye gaze and hand gesture device (1304), the user's touch of the input button, activates the input button (1306), the activation of the button, activates instructions associated to the button, in the elevator's computer, or glasses' computer, for the operation of the elevator (1308), the activated instructions, are used to direct the operation of the elevator (1310).

In the device software and operation flowchart the following steps illustrate the glasses and external device's operation, as shown in FIG. 21, an external device, or many different external devices broadcast, their device's operating control panel menus (2102) a MR glasses portable computing device, searches for external devices, broadcasting their operating control panel menus (2104) the glasses detect the external device's broadcast (2106) the glasses communicate with the broadcasting external device (2108) the glasses communicate with the broadcasting external device (2110) the external device's control panel menu is displayed, by the glasses, holographic ally in view of the user (2112) the user uses one of the many available inputs, such as, eye input into the eye tracker, to activate a desired operation, of the displayed external device's control panel menu (2114) the glasses transmit, the user's input, of the desired operation of the external device, to the external device (2116) the external device uses the received user input, of the desired operation, to operate the device (2118) the external device is operated, by the received, user's input (2120) the external device transmits information, about the operation of the external device, influenced by the user's input, to the glasses (2122) and the glasses show the external device's, operating information, holographic ally (2124).

Block Diagram of Components

A block diagram of the portable computer and external device's possible radio wave connections, solid lines show the portable computer and external devices are connected. Dotted line's show the solid lines show the portable computer and external devices are able to connect. The absence of connection line's show the portable computer and external devices are out of the connect area. The component connections are shown in FIG. 14, store checkout machine (2214), vending machine (2216), room temperature thermostat (2218), mobile device (2202), elevator (2204), smart toilet (2212), and medical device (2210).

The communication between the glasses computer, and the computers in the external devices, may use, a computer language and a computer connection that allows the devices to communicate. A communication software programmed into the glasses computer, and external devices computers, which is compatible between the glasses computer and external devices, is used for communication. The communication software enables the glasses computer, and external device's computer to communicate, with each other.

The glasses computer, and external device's computer uses standardized software enabling the communication between the glasses computer, and the external devices. There is a convergence of the glasses computer, and the devices computer software, allowing the ability to communicate between the glasses' computer and the external devices. The glasses computer, and devices use a universal software platform of software, and hardware, which allow the devices to communicate with the glasses computer.

In addition, the method, other processes and methods disclosed herein, the flowchart shows functionality and operation of one possible implementation of present embodiments. In this regard, each block may represent a module, a segment, or a portion of program code, which includes one or more instructions executable by the glasses, and devices processors for implementing specific logical functions or steps in the process.

Other Embodiments May be Utilized

In the detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein The Glasses Means The means for the glasses computer to have a connection to one or a plurality of differing external devices, when the portable computer is in the vicinity of one or more of the device, is the connecting of the glasses computer to the differing external devices, using radio waves. The means for the glasses' computer to communicate with one of the plurality of external devices and or the plurality of external devices, is a compatible software computer language used between the glasses computer and the devices computer.

The means for the glasses computer, to have the connected device's control panel communicated to the phone, is the ability of the device, to broadcast the device's control panel to the glasses, and the ability of the glasses, to download the control panel from the device. The means for the communicated device control panel to be shown on the display, is the glasses computer connected to the display.

The means for the user to operate the control panel shown on the glasses' device computer's display, is the software programmed into the glasses device's computer, allowing the user to mid-air touch input, eye tracker input, eye gaze input and hand gesture input, thought input, or voice input, the shown menu on the display. The means for operation of the control panel on the mobile device's display to operate the device, is the ability of the glasses to send to the external device, the user's touch input of the device operation menu, which activates various functions of the external device.

Different Ways of Communicating with the Elevator or Another Devices

1. Universal Remote Control Model

The MR glasses can act as a universal remote control, by performing interactions with embedded systems located in its proximity. To support proximity-aware interactions, both the Glasses and the embedded systems with which the user interacts have short-range wireless communication capabilities. Bluetooth, or Wi-Fi direct is used primary for the short-range wireless technology that will enable proximity-aware communication.

Since multiple embedded systems with different functionalities can be scattered everywhere, the glasses are able to discover automatically or on-demand embedded systems located in the proximity of the user. This is done using a short-range wireless device discovery protocol. At discovery time, the glasses learn the identity and the description of these systems. Each embedded system is able to provide its identity information (unique to a device or to a class of devices) and a description of its basic functionality in a human understandable format.

The user has pre-installed on the glasses the interfaces for interacting with the embedded systems. An alternative flexible solution is to define a protocol that allows the glasses to learn the interfaces from the embedded systems themselves.

The glasses can act as a universal remote control by performing interactions with embedded system located in its proximity. To support proximity-aware interactions, both the glasses and the embedded systems with which the user interacts must have short-range wireless communication capabilities. Due to its low-power, low-cost features, Bluetooth, and Wi-Fi direct is used for the short-range wireless technology that will enable proximity-aware communication.

Since multiple embedded systems with different functionalities can be scattered everywhere, the glasses should be able to discover automatically or on-demand the embedded systems located in the proximity of the user. This is done using a short-range wireless device discovery protocol.

At discovery time, the glasses learn the identity and the description of these systems. Each embedded system is able to provide its identity information (unique to a device or to a class of devices) and a description of its basic functionality in a human-understandable format.

The user has pre-installed on the Glasses the interfaces for interacting with the embedded systems. An alternative flexible solution is to define a protocol that allows a Glasses to learn the interfaces from the embedded systems themselves.

The glasses can connect to the internet using the cell phone radio waves that connect to a cell phone network.

2. Dual Connectivity Model

A universal interaction architecture based on the glasses is the dual connectivity model, in which the user connects both to the close-by environment and to the rest of the world through the Internet. This model of interaction, is based on the communication capabilities incorporated in the glasses. They have the unique feature of incorporating short-range wireless connectivity (e.g., Bluetooth) and Internet connectivity (e.g., General Packet Radio Service GPRS) in the same glasses personal mobile device. The glasses are connected to a cell phone network tower receiver, and transmitter. The glasses receive, and transmits data on the cell phone network. This is the enabling feature for a secure and generic framework of services over these glasses.

For example, an intelligent microwave oven equipped with a Bluetooth interface. This embedded system is very simple and is not capable of storing or transferring its interface to the glasses. However, it is able to identify itself to the glasses. Using this information, the glasses can connect to a server across the Internet (i.e., over GPRS) to download the code of the interface that will allow it to become a remote control for the microwave oven.

The glasses can also perform authentication over the Internet to ensure that the code is trusted. All further communication between this embedded system and the glasses happens by executing the downloaded code. This code will display on the glasses mid-air screen panel that emulates the panel of the microwave (i.e., it effectively transforms the glasses into an intuitive microwave remote control). Recipes can be downloaded from the web that can be downloaded and executed on the microwave. For this purpose, the microwave does not have to be connected to the Internet; it is the glasses that facilitates this action.

Another typical application is opening/closing Smart Locks. The entry in certain buildings will be protected using Smart Locks (e.g., locks that are Bluetooth-enabled and can be opened using digital door keys). The dual connectivity model enables users carrying glasses to open these locks in a secure manner. The glasses can establish a connection with the lock, obtain the ID of the lock, and connect to an Internet server over GPRS to download: The Gateway Connectivity Interaction Model the code that will be used for opening the lock (a digital door key can also be downloaded in the same time). The server hosting the interface and the keys for the Smart Lock maintains a list of people that are allowed to open the lock. The identity of the glasses user (stored on the Glasses in the form of her personal information) is piggybacked on the request submitted to the server. If the server finds that this user is allowed to open the lock, it responds with the code for the interface and the digital key.

The dual connectivity model can also be used to implement electronic payment applications. The user does not need to know about a vendor's embedded system in advance. The Glasses can authenticate the vendor using its Internet connection. The same connection can be used by the user to withdraw electronic currency from their bank and store them on the glasses. Another option provided by the glasses is to send some of the unused money back into the bank account (i.e., make a deposit each time the amount on the glasses exceeds a certain limit). Potentially, the vendor's embedded system can also be connected to the Internet. For instance, this ability can be used to authenticate the user.

3. Glasses, and Elevator Connected to the Internet

The MR glasses, and elevator are connected to the internet. Their locations are located on a google internet map. The glasses, and elevator identify other devices within their vicinity, such as, the glasses detects elevators, ATMs, vending machines, light switches, smart toilets, and the elevator detects the glasses.

The Glasses, requests the elevators operating menu, over the internet, when the glasses, are in the vicinity, 6 meters, of the elevator. The elevator sends the glasses, the elevator operating menu over the internet. The glasses download the elevator menu software. The glasses, displays the elevators menu in mid-air.

The elevator can also request, over the internet, the glasses, to receive the elevator menu software. If the glasses, agrees to receive the menu software, the elevator sends the glasses, the menu software over the internet.

The glasses, and elevator pre-register their availability to communicate, send and receive menu software over the internet, Glasses Software Architecture This architecture applies to all of the proposed interaction models. In the following, is briefly describe the components of this architecture.

The Bluetooth Engine is responsible for communicating with the Bluetooth-enabled embedded systems. It is composed of sub-components for device discovery and sending/receiving data. Although the Java API for accessing the Bluetooth stack has been proposed, it has not yet been implemented. Bluetooth Engine is a layer above the Bluetooth stack and provides a convenient Java API for accessing the Bluetooth stack. The downloaded interface is a Java program which cannot access the Bluetooth stack directly. It depends on the Java API provided by the Bluetooth Engine for communicating with the embedded device.

The Internet Access Module carries out the communication between the Glasses and various Internet servers. It provides a well-defined API that supports operations specific to our architecture (e.g., downloading an interface). The protocol of communication can be either HTTP or TCP/IP (on top of GPRS).

Discovering the Embedded Systems

The Proximity Engine is responsible for discovering the embedded systems located within the Bluetooth communication range. If an interface for a newly encountered system is not available locally (i.e., a miss in the Interface Cache) or through direct communication with the system, the Proximity Engine invokes the Internet Access Module to connect to an Internet server and download the interface for interacting with the device. The downloaded interface is stored in the Interface Cache for later reuse.

Together with the interface, an access control handler can also be downloaded. Such a handler executes before any subsequent executions of this interface. The Proximity Engine informs the Execution Engine to dispatch the downloaded interface for execution. All further communication between the glasses and the embedded system happens as a result of executing this interface.

The Execution Engine is invoked by the Proximity Engine and is responsible for dispatching the downloaded interface program for execution. The downloaded interface interacts with the Bluetooth Engine to communicate with the embedded system or with other glasses. This interface may also interact with the Internet Access Module to communicate with the webserver. It may need to contact the webserver for security-related actions or to download necessary data in case of a miss in the Personal Data Storage.

Storing the Code

Interface Cache stores the code of the downloaded interfaces. This cache avoids downloading an interface every time it is needed. An interface can be shared by an entire class of embedded systems (e.g., Smart Locks, or Microwaves). Associated with each interfaces are an access control handler that executes before any subsequent invocation of this interface (e.g. It checks if the interface is still allowed to run, sets the permissions to local resources).

Personal Data Storage acts as a cache for "active data", similar to Active Cache. It stores data that needs to be used during the interactions with various embedded systems. Each data item stored in this cache has a number of handlers associated with it that can perform various actions (e.g., access handler, miss handler, eviction handler). Examples of such data include digital door keys or electronic cash. Each time an interface needs some data, it checks this cache. If the data is available locally (i.e., hit) the program goes ahead; otherwise (i.e., miss), it has to use the Internet Access Module to download the data from the corresponding server in the Internet. Any embedded system is registered with a trusted webserver (the webserver is just a simplification, since this is in fact a web service distributed on multiple computers). At registration, the webserver assigns a unique ID and a URL to the device. All the information necessary to interact with the device along with a user interface is stored at that URL. This URL may be common for an entire class of embedded systems.

The interaction protocol that takes place when the glasses needs to interact with an embedded system. The user invokes the Proximity Engine each time user needs to interact with a device located in the proximity. Once the embedded systems in the proximity are identified, the user chooses the one they want to interact with. A request is sent to the embedded system to provide its ID and URL. Upon receiving the ID and URL of the embedded system, the glasses execute the access control handler and then loads and executes the interface. In case of a miss in the Interface Cache, the interface needs to be downloaded on the glasses either from the webserver or from the embedded system itself.

Trusted Interface Downloads

An interface downloaded from an embedded system is un-trusted and is not allowed to access to local resources on (i.e., sandbox model of execution where it can only execute commands on the device). The interfaces downloaded from the webserver are trusted; they are assumed to be verified before being distributed by the server. The glasses request an interface for the ID provided by the device (using the URL provided also by the device). With this request, the glasses also send its ID (stored in the Personal Information Storage). The glasses are granted permission to download an interface, subject to the access control enforced based on the glasses ID and, potentially, other credentials presented by the user. Once the access is granted, the webserver responds with the interface needed for any further interaction with the device.

The data stored in the Personal Data Storage can be classified into three categories: Description of the downloaded interfaces. The code of the downloaded interfaces is stored in the Interface Cache, but its description is stored in the Personal Data Storage.

Every downloaded interface has an ID (which can be the ID of the embedded system or the class of embedded systems it is associated with). This ID helps in recognizing the cached interface each time it needs to be looked up in the cache. In addition to assigning an ID, the access and miss handlers associated with the interface are also defined. For instance, the user might define the time period for which the interface should be cached, or how and when it can be reused.

Confidential Data

Example of confidential data include electronic cash or digital keys. Every confidential data item has a data-ID and handlers associated with it. The handler's define a mechanism for evicting the data entity, sharing it across applications, or controlling the access to it. For instance, electronic cash can be sent back to the bank at eviction. The handlers also let the glasses user has control, over the confidential data stored on the glasses. Any application that needs to access a confidential data item accesses it through the handler. The data item handler may either have an access control list of applications that are allowed to access it, or may pop up a choice menu to the user every time an application tries to access the data entity. Handlers are also provided for fetch data in from the corresponding server when it is missing in the cache.

Personal Information of a User

Personal information of the user in form of his name, credit card information, is stored in this cache. This information is used for authenticating the user to applications that require that level of security, such as the digital-key application mentioned earlier. Personal information is primarily accessed by the architecture components of the glasses. Applications may access this information through the handler associated with this data.

An Elevator Connected to Mr Glasses Operation

The user can use eye gaze 218, and hand gestures that are in view of the glasses 202, while wearing the glasses on their head, to activate holographic elevator input icons, as illustrated in FIGS. 2, 3, 4, 5, 6 and 7. The user can use thought, to highlight 226, and activate, the icon command 214 they want activated, or speak the icon they want to activate, or use the tracking of their eye gaze 224, to activate the icon they want activated, or touch an icon to activate the icon 222.

The elevator broadcasts radio waves that it is available to have its control panel menu down loaded. The Glasses 202 receives the broadcast, and downloads the menu. The glasses display the menu 204 in mid-air. The glasses and elevator are connected wirelessly, and transmit and receive information with each other.

FIGS. 3, 5, and 7, shows the view of the elevator mid-air display, from the user's perspective as they look thru the glasses lens, or display.

Eye Tracking Input

The user gazes, looks 216 with their eyes at the icon command 214 in mid-air, that they want to activate, for a predetermined amount on time, such as, 0.2 seconds, as illustrated in FIGS. 2, and 3. After 0.2 seconds of gaze 216, the icon is, highlighted 226. After 0.4 seconds of gaze, the icon is clicked, and the icon command is activated. The user 210 can active another command after the first command is activated, etc. The eye tracker 244 detects the icon the user gazing is at.

Eye Gaze, and Hand Gesture Input

The cursor is moved to the icon, to be activate, as illustrated in FIGS. 4, and 5. The user uses eye gaze, by gazing at the icon, to signal that the user wants the cursor to move to the icon. The cursor moves to the icon, that is being gazed at. The user use's hand gestures to activate the icon, that the cursor is contacting, or near to.

The user can also highlight an icon they want to activate, by gazing at the desired icon. Once the icon is highlighted, the user use's hand gestures in mid-air, in the view of the camera, to activate the icon.

Touch Input

The user 210 touches the command icon, or letter 214, they want to activate, as illustrated in FIGS. 6, and 7. A second camera in the glasses views, and detects the user's touch of one of the input icons. The computer activates the touched icon.

Thought Input

The user uses their mind to think about, and highlight the command they want to activate, for a predetermined amount on time, such as, 0.6 seconds, at 0.6 seconds the command is clicked, by the user and the icon is activated.

Connection Between the Elevator and the Glasses

The user can set the glasses, to automatically, or manually, connect to the elevator. When the glasses connect to the elevator, the display menu for the elevator is transmitted to the glasses. The received elevator control panel menu is displayed, in mid-air for the user to view, and input in to.

The menu control panel, in mid-air, is pinned to a location which is touch assessable by the user such as, 0.5 meters in front of the user, when the user outside and near the elevator, for example 6 meters from the elevator. The user views the different input commands for the elevator, such as, up indictor button, down indictor button, and ring bell button.

The menu changes from the outside menu, to the inside menu 1204, when the user enters the elevator. The menu broadcast to the glasses, when the glasses 202 are outside the elevator, is the outside menu. The menu broadcast to the glasses, when the glasses are inside the elevator 1208, is the inside menu.

When the glasses 202 are inside the elevator, the elevator's inside mid-air control panel is pinned to a location, which is touch assessable by the user, such as, 0.5 meters in front of the user. The inside holographic control panel 1204 shows elevator control commands, such as, the a multiple of floor request button numbers, door open button, and ring bell button. The glasses detect its location outside, and inside of the elevator.

The user can change the location that the mid-air input display is positioned or pinned to in mid-air. The display location can be pinned to a location which is convenient for the user to interact with.

When the desired elevator icon is activated, the elevator transmits to the glasses that the icon is activated. The elevator sends data about the status of the activated device, such as, the elevator floors location. The data sent from the elevator, is displayed on the mid-air display. The displayed data keep the user informed, about the elevator operation, and interaction with the user. The user can user the displayed elevator data, to adjust the operation of the elevator, such as, the user can view the floor the elevator is on, the changing floor numbers, an open door button, to open the door as the door is closing.

The Tobii eye tracker, the Emotiv thought headset, the speech recognition device, eye tracking input device, eye gaze input device, and hand gesture recognition device, are user input devices, which are part of the headset. The input devices in the headset, detect user speech recognition, eye gaze input, eye tracking, thought, and hand gesture recognition. The user input, detected by the devices, is used to operate the elevator.

The benefits of holographic input are the user has eliminated contact with multi-user input buttons which may have harmful bacteria on them. The user doesn't need to be close to a device to operate the device. The device can be operated without other people being aware of the users input, and it may be enjoyable to view device inputs holographic ally Transference of bacteria from the control panel is reduced, by using the mid-air menu control panel to influence the operation of the elevator.

MR Glasses Connected to the Internet Description

MR glasses 802 can connect to the internet in two ways. One connection is for the glasses to connect to the internet, over a cellphone network. A second connection is for the glasses to connect to a device that is connected to the internet, such as, an internet router, or cell phone.

The MR Glasses 802 are connected to a blue tooth, Wi-Fi radio device transmitter and receiver, as illustrated in FIG. 8. The glasses transmitter and receiver, connect wirelessly, using Wi-Fi, to an internet router, which has a transmitter and receiver.

The MR Glasses 802 are connected to a mobile device (not shown) that is connected to the internet, such as, a smart phone, a laptop computer, or a tablet, each have a blue tooth or Wi-Fi radio device transmitter and receiver. The glasses connect wirelessly to the mobile device when the glasses are within 5 meters or more of the laptop.

The glasses have a cell phone network, transmitter and receiver, that connects to the glasses computer. The transmitter and receiver, connect to a cell phone network, such as, a Global System for Mobile GSM, or a Code Division Multiple Access CDMA cell phone network.

The internet can be accessed over the cell phone network. Internet webpages can be displayed holographic ally 804, and interacted with by a user, with the devices in the glasses.

The smart phone displays a menu of application, or software operating instructions for the various functions and devices of the smart phone. The smart phone APPS are displayed, on a mid-air menu by the glasses.

A MR keyboard, mouse, and touch input pad are part of the smart phone display. The phone's display is displayed in mid-air. The user can interact with the display, in the same way as the phone touch screen. The mid-air menu can be pinned to a location near the phone.

A Tobii eye tracker, an Emotiv thought headset, a speech recognition device, eye tracking input device, eye gaze input device, and hand gesture recognition device, are user input devices, which are part of the headset. The input devices in the headset, detect user speech recognition, eye gaze input, eye tracking input 816, thought, and hand gesture recognition. The user input, detected by the devices, is used to interact with the web page.

MR Glasses Connected to the Internet Operation

The user uses eye tracking input 816, to activate a holographic weather icon 814, on a mid-air web page 804. The user gazes 816 at the icon 814 and the icon activates, as shown if FIG. 8.

The user interacts, using the eye tracker device, and inputs into the smart phone display in mid-air. The interaction with the display, is the same as interaction is with the smart phone touch screen.

The display icons, include, a google web search icon, or other search engine icon, that the user can type in a word, words to search the internet for. Display icons can be activated, such as, news, a start button, web page links, sports, entertainment, computer games, and health.

The user inputs letters, icons, and numbers into the laptop, by individually inputting one of the them. The user can move the mid-air mouse to move a cursor on the display. The mid-air mouse can left, or right click on, and activate icons, on the display. The input of the keyboard letters, numbers, is shown on the display. The input commands affect the operation of the phone.

The user can touch input one of the mid-air input icons, or letters of the mid-air display menu, by touching one or more of the of the displayed mid-air input icons, or letters. The user can hand gesture touch input one of the mid-air input icons, or letters of the mid-air display menu, by touching one or more of the of the displayed mid-air input icons, or letters. The user can use eye gaze and hand recognition, to input one of the icons.

The user can verbally input one of the mid-air input icons, or letters of the mid-air display menu, by verbally inputting one or more of the displayed mid-air input icons, or letters. The user can eye tracking input one of the mid-air input icons, or letters of the mid-air display menu, by eye inputting one or more of the displayed mid-air input icons, or letters. The user can use thought to input one of the mid-air input icons, or letters of the mid-air display menu, by thought inputting one or more of the of the displayed mid-air input icons, or letters.

The keyboard can be used in an environment where there is concern for bacterial contamination, in a bacteria free environment, such as, a medical, and hospital environment. The keyboard can also be used in hospital surgery rooms, to hygienically touch input, into the computer while operating. The letters inputted into the keyboard are shown on the display.

Operating a Device Over the Internet

The user can operate a device over the internet. For example, the glasses can connect to a temperature control unit, or thermostat for a living area, over the internet. The user can view a hologram of the thermostat, and change the temperature setting of the thermostat, by using the user's finger's touch of different setting displayed on the thermostat, to input a different setting into the thermostat. The different setting is sent to the thermostat, which uses the different setting to change the temperature setting of the thermostat.

A Store Checkout Payment Station Connected to MR Glasses Description

MR glasses 902 are connected, to a blue tooth or Wi-Fi radio device transmitter and receiver, as illustrated in FIGS. 9A, 9B and 10. A store checkout payment station 1906 is connected to a blue tooth or Wi-Fi radio device transmitter and receiver device. The glasses connect wirelessly to the store checkout payment station radio device when the glasses are within 5 meters or more of the payment station.

The payment station has software operating instructions for the various functions and devices of the payment station. The payment station instructions are displayed on a mid-air menu by the glasses.

A Tobii eye tracker 924, and thought headset work with and complement the glasses' devices, which include, speech recognition, voice recognition, eye tracking input, hand gesture touch, and eye gaze and hand gesture recognition.

The menu is pinned to a credit card debit card reader. The station has two credit card readers 918. One card reader, is radio frequency identification card reader (not shown), for tapping the card on the reader, to input the card. A holographic display 820, created by the glasses, is viewable by a user 910.

A Store Checkout Payment Station Connected to MR Glasses Operation

The payment station broadcast radio waves, that it is available to have its control panel menu down loaded, as illustrated in FIGS. 9A, 9B and 10. The glasses 902 receives the broadcast, and downloads the menu. The glasses display the menu in mid-air. The glasses and payment station 908 are connected wirelessly, and transmit and receive information with each other.

The user can set the glasses, too automatically, or manually, connect to the payment station. When the glasses connect to the payment station, the display menu for the payment station is transmitted to the glasses. The received payment station control panel menu is display in mid-air for the user to view and input in to.

The user inputs numbers into the pad 904, by individually touching one of the numbers 914, such as, a number 4. The numbers can be entered, to input a debit card pin number into the computer. The input can be shown on the display 920. A credit card can be read by the station.

The menu in mid-air control panel 904, is pinned to a location which is touch assessable by the user, when the user is near payment station, such as, 0.5 meters in front of the user. The user views the different input commands, for the payment station, such as, a ten key number pad, amount of purchase, accept purchase amount, enter, and credit card number.

The user 910 touches the icon command they want to activate, or uses thought to highlight the command they want activated, or speaks the command they want to activate, or uses their eye tracking gaze to activate the command they want activated.

The user gazes 914 with their eyes at the 8 number input icon command 918 they want to activate, for a predetermined amount on time, such as, 0.2 seconds, in FIG. 10. At the 0.2 seconds the icon command is clicked, by the user and the command is activated. The user can active another icon command after the first command is activated, etc. The eye tracker 924 views and tracks, the user's eye's gaze 914 while they wear the glasses 902.

The user uses mind thoughts to think about the command, for a predetermined amount on time, such as, 0.6 seconds, at the 0.6 seconds the command is clicked, by the user and the command is activated. The user can active another command after the first command is activated.

The user can change the location that the mid-air input display is positioned or pinned to in mid-air. The display location can be pin to a location which is convenient for the user.

When and payment station icon is activated the station transmits to the glasses that the icon is activated. The payment station sends data about the status of the activated device, such as, payment accepted, or enter pin number.

The data sent from the payment station is displayed on the mid-air display. The displayed data keep the user informed about the payment stations operation, and interaction with the user. The user can use the displayed station data, to adjust the operation of the payment station, such, changing a personal identification number PIN number if a first number is incorrect.

Mid-air touch input of one of the holograms, by the user's finger, inputs a request to the computer, as illustrated in. The computer directs the payment station to carry out the input request of the user. For example, the user touches enter input hologram. The enter input is detected by the sensor and the computer. The computer inputs a PIN number inputted by the user.

Transference of bacteria from the payment station touch control panel is reduced, by using the mid-air menu control panel in influence the operation of the payment station.

A Glasses Headset Used as a Head Up Display for a Car Description

MR glasses 1102 are connected to a blue tooth or Wi-Fi radio device transmitter and receiver, as shown in FIG. 11. A car's devices are connected to a blue tooth or Wi-Fi radio device transmitter and receiver device. The glasses connect wirelessly to the car's devices 1106, when the glasses are within 5 meters or more of the car, and when the driver is in the driver's seat.

The headset's 1102 thought brain wave detecting sensors 1128, are used to detect to the user's though input commands, in FIG. 11.

The car has software operating instructions icons, for the various functions and devices of the car. The car instructions are displayed on a mid-air menu by the glasses.

The menu is pinned to the dash board of the car. The car's devices can include, radio 1106, climate control temperature, head lights, interior lights, ignition on or off, air fan speed, air venting defrost or feet warming, movies for passengers, computer games for passengers, engine temperature, oil warning light, and seat belt off warning.

One hologram displays an increase symbol 1120, a second hologram displays a decrease symbol 1122, and a third hologram displays a, toggle, or change car component symbol 1112.

The glasses project a user interface 1104 above the car dash board 1108, and within touching distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Car instruments can be displayed by holograms, such as, speedometer, engine revolutions, engine oil alert, and engine temperature alert.

The radio hologram interface includes, a graphic number station indicator 1114, 1126, a sound volume indictor 1116, 1118 a switch to another device switch, sound volume increases 1120 or decrease 1122 holograms, and radio station change station increase or decrease holograms 1126.

The vehicle is equipped with, and connected to the cars computer, pedestrian or vehicle detection sensors, radar, and vehicle cameras and sensors (not shown).

The Tobii eye tracker, the Emotiv thought headset 1102, the speech recognition device, eye tracking input device, eye gaze input device, and hand gesture recognition device, are user input devices, which are part of the headset. The input devices in the headset, detect user speech recognition, eye gaze input, eye tracking, thought, and hand gesture recognition. The user input, detected by the devices, is used to operate the car.

A Glasses Headset Used as a Head Up Display for a Car Operation

The car broadcast radio waves that it is available to have its control panel menu down loaded, as shown in FIG. 11. The glasses 1102 receives the broadcast, and downloads the menu. The Glasses displays the menu in mid-air. The glasses and car are connected wirelessly, and transmit and receive information with each other.

A user can set the glasses, too automatically, or manually, connect to the car 1108. When the glasses connect to the car, the display menu for the car is transmitted to the glasses. The received car control panel menu is display in mid-air for the user to view, and input in to.

The menu in mid-air control panel is pinned to a location which is touch accessible by the user when the user is near dashboard, such as, 0.5 meters in front of the user. The user views the different input commands for the car, such as, turn on or turn off lights.

The user touches the command they want to activate, or uses thought to highlight the command they want activated, or speaks the command they want to activate, or uses their eye gaze to activate the command they want activated.

The user gazes with their eyes at the command they want to activate, for a predetermined amount on time, such as, 0.2 seconds, at the 0.2 seconds the command is clicked, by the user and the command is activated. The user can active another command after the first command is activated.

The user uses mind thoughts to think about the command, for a predetermined amount on time, such as, 0.6 seconds, at the 0.6 seconds the command is clicked, by the user, and the command is activated. The user can active another command after the first command is activated.

The user can change the location that the mid-air input display is positioned or pinned to in mid-air. The display location can be pin to a location which is convenient for the user.

When a car icon is activated, the car transmits to the glasses, that the icon is activated. The car sends data about the status of the activated device, such as, speed of the car. The data sent from the car is displayed on the mid-air display. The displayed data keep the user informed about the cars operation, and interaction with the user. The user can use the displayed car data to adjust the operation of the car, such as, changing the speed of the car.

If a pedestrian or vehicle is detected to close to the car, or on a course where the pedestrian or vehicle may contact the car, the pedestrian is highland on the windshield. The pedestrian or vehicle is viewable with a red flashing outline, halo around the pedestrian. The highlighting allows the driver, to take action to avoid possible contact, with the pedestrian or vehicle. The pedestrian or vehicle is detected by sensors, radar, pedestrian or vehicle cameras and sensors in the car (not show).

Mid-air touch input of one of the holograms, by the user's finger, inputs a request to the computer, as illustrated in FIG. 11. The computer directs the car to carry out the input request of the user. For example, the user touches enter input hologram. The enter input is detected by the sensor and the computer. The computer directs the car use the light's high beams.

The user can input using the glasses' devices to input, such as, using speech recognition, eye input, and hand recognition. The user can user the eye tracker, and or the emotive thought head set it input into the glasses' computer The glasses allow the driver to keep their eyes on the road with needing to look away from the road, while operating the cars device. The user can operate the car's devices without being distracted by looking at the devices operating control panels. Being able to view the road while driving, increases the ability to drive safely without distraction.

The user can maintain their view of the road while driving, and operate components of the vehicle without having to take their eyes off the road, and by touching holograms which are in direct view of the user. In FIG. 11, the holograms act as a heads up display, of available touch input commands which are used to operate the various car components. The user can view the car's speedometer, or engine rpm, holographic ally.

The input of one of the holograms inputs the action, or command associated to the hologram. The user touches the input area 1108 associated with the hologram, when they touch the hologram. The computer receives the input, and activates the function associated to the input. The device associated to the function receives operating function instructions from the computer. The device's operation is effected by the computer instructions.

For example, the user can increase the volume of the radio, by touching the increase symbol 1120, or decrease the volume of the radio by touching the decrease volume symbol 1122. The can view the volume of the radio on the volume indicator 15'6. The user can view the number 1124 the radio station the radio is tuned to. The user can change the station, by touching the radio station change station increase or decrease holograms 1126. The user can switch between the radio receiving amplitude modulation AM, and frequency modulation FM radio waves, by touching the change car component symbol 1112.

When the change component hologram 1112 is touched, it goes to the next component, and displays the components hologram interface. Other components include, climate control heat, and head light brightness. The change holograms image changes, to represent the competent is use, such as, a musical note symbol is shown when the radio is on, or a light bulb is shown when the lights are chosen for input.

The user can turn on the head lights by contacting the turn on head lights hologram (not shown) with their finger. The user's finger's contact with the light hologram is detected by the sensor and the connected computer. The computer activates the turn headlight on function. The computer sends instructions to the headlights switch to turn on the headlights. The light switch is switched to the on position, the lights are turned on.

The user can keep or remove different devices control panels, to lessen the number of control panels viewed. The holograms can be used for different devices, by changing the components the holograms are associated to. The change to another device switch of the input holograms 1118 is used to switch or toggle between the different components. For example, the holograms may be used in the operation of the radio, the user can switch their association to a next component, such as, the operation of a ground positioning system GPS map display, or the air heating system.

The holograms can remain continually activated, or can be turned on and off, by the user moving their hand to contact a turn off or turn on off hologram (not shown).

A Remote Store Control Checkout Panel is Downloaded to MR Glasses Description and Operation MR glasses can be used to shop in a store, with out interacting with a store employee. The user can self-serve checkout at a self-serve checkout station. The screen is the same on the glasses and on the checkout station. The user could also checkout using a barcode scanner incorporated into the glasses, by scanning the items barcodes with the glasses. Paying for the items on the display with a credit card that is stored on the glasses. The items anti-theft devices connected to the items, can be turned off after payment.

The camera in the glasses, can view the items before payment, to make sure the user hasn't made a mistake with the number of items, and that all items have been charged. If a mistake is detected the glasses audibly and visually alerts the user. The checkout process is monitored by store employees, who view the process on display screens, and view the same screen that the user views, and view the user. The user could also pick items, record their barcode on the glasses and at checkout have the recorded items brought to them.

The mobile device computer and external devices use a universal software enabling the communication between the mobile device computer and the external devices. The mobile device computer and devices use a universal software platform of software, and hardware, which allow the devices computer to communicate with the glasses computer.

The products can be equipped with anti-theft devices, that signal that they haven't been purchased, and when the user leases the store with out paying, and would signal an alarm.

Glasses Used to Operate Multiple Devices Description and Operation

The glasses can show a multiple of different devices control panels, in FIG. 12. The holographic control panels can be used to save space, reduce the number of physical control panels, and reduce the need for each device to have a physical control panels. The glasses 1202 can display the control panel for many different devices. The glasses control panels can save the space needed for physical control panels.

One pair of glasses can be used for operating a variety for different devices, on a space station, or submarine where space is a consideration. The glasses can operate, a space station robotic moving arm. In a different input configuration, the input device can operate a station camera, or a climate control panel.

A hologram on button for the space station moving arm, can be a hologram of an orange. When the control panel is changed to operate a different device, such as, the camera, the on button can be a hologram of an blue diamond.

The touch input holograms view, color and shape can be changed, when operating different devices. The input holograms view, color and shape are created to be specific to the device, that the input button are associated to The different devices each have a computer that they are connected to. The devices computers communicate with the computer in the glasses.

On Off Switch in a Dust Free Environment Description

Hologram input may be beneficial to input in a dust free environment, such as, microprocessor fabrication environments. Hologram input displays don't have moving parts.

Physical key boards have moving parts, whose movement may create friction, which can create dust.

When a finger or glove touches a surface to input, the touching of the finger to the surface, creates friction between the finger and the surface. The friction causes particles from both surfaces detaching from the surfaces, and becoming airborne. The particles then descend to a surface, which creates dust on the surface. Dust on the surface of a microprocessor, may have a negative impact on the microprocessor's production.

A holographic keyboard is connected to a computer in the dust free environment. The on off switch is connected to a microprocessor fabrication machine.

MR reality glasses are used in the dust free environment to input into a control panel in the environment, to operate a device.

On Off Switch in a Dust Free Environment Operation

The user views the different hologram button inputs. Each button is associated to a selection, of one of a variety of operations of one of the devices, in a dust free environment, such as, the computer, or microprocessor fabrication machine. The user chooses a hologram, to select the desired device operation.

The software detects, in the images from the camera, the user touching the activation area. The device operating instructions associated to the hologram, are activated. The activated instructions for the operation of the dust free environment device, are sent to the device. Operations of the device, may include, the turning on or off, of the device.

The user can turn the device on or off, by touching in mid-air either the on or off hologram. The detected touch is interpreted, as an input by the user. The input is associated to, either an on or off input. The sensor connected to the computer, detects the touch of the area. The device's operation is affected by the input from the switch.

Locating the of touch input area below the holograms, allows the user to touch the hologram before committing to the touch input. The touch input occurs by moving their finger forward, and closer to the hologram, and contacting the input area.

An audible sound is produced by a speaker when the finger contacts the input area. The sound could be a beep sound, or a bell sound. The sound informs the user that their finger has contacted the input area. A sound is produced 0.4 cm before the finger contacts the input area, to inform the user that their finger is close to contacting the input area.

A sound is produced by the speaker when the finger is 0.5 cm closer to the hologram then the input area, to inform the user that they are close to touching the hologram with their finger. The sound enables the user to move their finger away from the hologram, before contacting it with their finger.

A unique sound is associated to each hologram that is touched. The sound enables the user to audibly associate the sound, to the hologram they are touch activating.

A Device Operated in a Flammable Environment Description

Hologram input may be beneficial in a flammable environment. By eliminating electric discharge from a user's finger while touch inputting. Electric discharge might ignite airborne flammable particles.

An on off switch using holograms, is operated in the flammable environment. The switch deceases the chance of a static electric spark from being created when the finger touch's an input surface, such as, when the user's finger contacts an on off switch's physical input surface. The chance of a flammable vapor or particle igniting in the flammable environment, is decreased, by decreasing the chance of a static electric spark.

Holograms associated to an operation of the device, may include, a variety of different holograms, or hologram inputs, such as, numbers or letters, and device commands for inputting into the device.

Electric discharge from the user's finger to a surface input button, is eliminated by touch inputting into one the holograms. The hologram is in midair, and isn't grounded. Eliminating the electric discharge, decreases the chance of an igniting flammable material, or combustible vapors in the flammable environment.

Flammable environments can include, grain elevators with grain dust, petroleum refineries, and hydrocarbon carrying oil tankers. Devices in the environments can include, a gas compress, a ventilation device, communication devices, and a fire extinguisher system. Mid-air input displays may be used in space stations, where static electric may be a problem, caused by the dry air environment.

A Tobii eye tracker, and thought headset work with and complement the glasses' devices, such as, speech recognition, eye input, and hand recognition A Device Operated in a Flammable Environment Operation The user views the different hologram button inputs. Each button is associated to a selection of one of a variety of device operations. The user chooses a hologram or combination of different hologram to input, and to select the desired device operation.

The activated instructions for the operation of the device in the flammable environment are sent to the device in the flammable environment. Operations of the device, may include, the turning on or off of the device.

Users with Augmented Reality Glasses Communicating with Each Other Description and Operation The user can create an avatar of themselves. The avatar can be a photo realistic view of the user. The avatar could be an avatar, such as, a bug's bunny cartoon character, or a penguin. The glasses view the user's movements. The user's movement are transmitted to the avatar; the avatar moves similarly to the user.

Sharing Lunch

The glasses can view the user's surroundings, environment and send the images to a second user. For example, the first user can be eating lunch, the view of the dish that the user is eating, can sent to the second user. The second user can view the changes to the dish, as the first user eats the dish. The two user's view, each other, and their faces, us if the user's were physically present within each other's environment. The surroundings of the other user can be viewed by the user, such as, other people in the environment, the décor of the restaurant. The distance that the other view of user, is away from the user, can be set by each user.

Playing Ping Pong

Users can play games with each other, over the internet, while they are at different locations. Games, such as, ping pong, tennis, horse shoes, scrabble, card games, and board games. Each user can touch, the other user's hologram.

For example, one user sees the other user's avatar hit a ping pong ball on to a table tennis table. The ball bounces toward the user the user positions a real, or mixed reality ping pong paddle to bit the ball back to the other user. The other user sees the ball return with the contact of the ball off of the user's paddle. The ball is volleyed back and forth between the users, until one of the users misses hitting the ball, the ball is hit to far from the table, or the ball contacts a net on the table.

Users Conversing

The user's verbally talk to each other using a microphone, and speaker in each pair of glasses. The vocalizations of the first user are detected by the first glasses' microphone, and sent to the second user's glasses speaker. The second user hears the first user's vocalizations produced, broadcast in the second user's glasses speaker. The second user sends vocalizations to the first user's, in the same fashion as the vocalizations sent by the first user to the second user.

Visual messages, and or videos can be sent by one user to another user. Messages can be text messages, or emoji's. Videos can be live, or pre-recorded videos, or single pictures.

Each user is connected to the internet; the users communicate with each other over the internet. Two or more users can view each others avatars, talk and hear the other users simultaneously.

Separate cameras could also be used, to view each user. The cameras can connect wirelessly to the glasses. The images can be used to create an avatar of the viewed user. The user images, avatar and movement of the images of themselves, can be sent to the other user's glasses.

User Sending Other Users Holograms

The use can send another user, a hologram, or software application APP over the internet. The other user can be connected to the user sending the hologram, or the hologram can be sent the other users, email, download file, social media applications, or messenger application. The user can download the hologram from the messenger application to the glasses, and view the hologram on their glasses.

3D Printing of Holograms

A 3D printer can be connected wirelessly to the glasses computer. The user can instruct the glasses, to instruct the 3D printer, to print a 3D shape of the hologram. The holograms information is sent to the 3D printer. The printer prints the 3D shape, of the object from the received computer instructions. A 2D printer can be connected the glasses computer. The glasses can instruct the 2D printer to print a 2D view of the hologram.

Pre-Set Setting for Use with a Multitude of Differing Devices Operation and Description A user's MR glasses 1202 can connect to and send pre-set user settings for an external device's operation, in FIG. 12. Devices using pre-set setting may include, a gas pump, a medical device, a store checkout station, a smart toilet 1204, an elevator 1208, a ATM, a space station device 1206, a flammable environment device, door locks, a car lock, a car starting device, a room temperature thermostat, apartment lights, and a microwave oven.

Communicating Device Settings

The glasses may connect to and communicate device settings, to differing external devices, using a radio wave 1210 connection between the glasses and the differing devices, and or an internet connection between the glasses and the differing devices.

The external devices broadcast that a glasses connection is available to the devices. The glasses searches for an external device broadcasting the available connection. When the glasses find a broadcasting device, the glasses connect to the device. The glasses and device communicate sharing information, and the Glasses identifies the device. The glasses send to the device, the user device settings, associated with the device. The device uses the received device settings in the operation of the device.

Stored Settings

The settings can be stored on the glasses, in a profile of user settings, which are associated with the user. The devices can connect to an internet router, the router connects to the internet, using a wired and or radio wave connection.

The user can see an icon, with a description of the device associated with the icon which has had its settings sent to. The user can see the devices.

If the device doesn't receive device settings from the glasses. The device would request the user's identification. The glasses send the user's identity to the device. The device searches for stored settings, associated with the user identity on the device's computer. The device's computer finds a match with the user's identity and stored user identity.

The user's stored device settings, associated with the user would be activated. The device uses the received device settings, in the operation of the device. The settings can be stored in a profile of user settings, which are associated with the user. The user profile settings are stored on a computer, connected to the device.

Pre-set setting can be stored on the user's glasses, or stored on the device, or stored on a server, on the internet cloud. The device can access the server, with a connection to the internet. The server stores the user's pre-set settings. The server can have a web site, which allows the user to store their pre-set settings, on the sites server. The device would use the user's identity, to search for the setting associated to the user, on the web site.

The User's Identity

The device and server communicate the user's identity. The server computer finds a match with the user's identity, and the stored user identity settings. The server sends the user's settings, to the device. The device uses the received device settings in the operation of the device. The devices can use a wired or wireless connection to the internet. The device could connect to the glasses, and use the glasses' internet connection, to access the server.

The device may try other ways to identify the user, such as, facial recognition. If facial recognition is successful, in identifying the user, the devices stored setting associated with the user, would be activated. The settings are stored on a computer, connected to the device.

Pre-set setting can be set to be activated during a certain time. For example, a user' elevator settings may be set within a time period, such as, if the time is between 8:30 and 9:00 am the setting would a request of an up elevator, and a setting of the elevator for the 4 floor. Store checkout machines can use pre-set payment setting information, such as, paying with the purchase with a credit card. Smart toilet 2104 settings may set the bidet water pressure too medium, within a time period from 1 pm to 7 pm.

Other devices could be used to with the user's settings stored on them, and able to communicate with the device, such as, a radio frequency identification device (not shown) having stored user settings. The devices could store the user's settings, and activate the settings, with the identification of the user.

The user's identity can be associated with settings stored, with the device, which are activated when the user is identified. The user can also be identified by facial recognition, eye recognition, and voice recognition, for example, the smart toilet, can identify a user using facial recognition, and set the bidet water temperature too medium. The user's identification can be sent to the device, from the glasses.

Self-identification, self-input of identity such as, saying their name, can be used to identify themselves to the device. The user can set the settings to be activated automatically, or manually. The manual operation could have the device, requesting the user, to send the device's settings.

Different Settings, and Different Devices

An icon of the device, is shown on the glasses' display. The user would send the setting, by touch activating the icon. The glasses could also be set, to notify the user of a device's settings request, such as, the glasses making an audible sound.

The user could also set the setting's to be turned off. The glasses would communicate to the device, that no user setting should be activated by glasses. If more than one user setting is detected, the first detected user setting would be activated.

The glasses can have setting for differing devices, such as, water temperature settings for smart toilet bidet water streams 1204, default floor request settings for elevators 1208, medical device settings 1206, setting for room temperature, settings for car user lock entry, car console input forms, such as, mid-air holograms colors, design, style, location of instruments, and car input devices, such as, car heater, air conditioner, car lights, and car radio default channels.

Pre-set settings for differing devices can be entered in to the glasses. The device's setting would be used by devices in a group of devices. For example, setting for smart toilets would be used for toilets of differing companies, makes and models. A user's water temperature setting, would be used for all the differing toilets. The user could also specify that the water temperature setting, water pressure, and water spray pattern, can be used by a certain group of toilet and a different water temperature setting used with another group of toilets. The setting can also be restricted to the use of specific individual devices.

The user can pre-sets setting by choosing devices, from a catalogue of devices, shown on their glasses. For example, the user could scroll to an image of a smart toilet. The user would touch the icon which would expand a menu of toilet and toilet bidet settings. The user would choose settings from the menu of toilet setting, such as, bidet water temperature, warm or cool. The user would save the setting for the toilet.

The setting would be used with the operation of the toilet. If the device isn't in the menu the user can create their own device and device setting. The user could also search the internet, to find the desired device with settings and download it to their Glasses.

The glasses could also remember the devices setting, when the user uses the device. The user uses the device, and the device remembers the setting, the user used when operating the device. The device communicates with the user's glasses. The device would send the users setting to the glasses. The remembered settings could be used the next time the user uses the device.

This reduces the need for the user to enter setting into the glasses. For example, the user, sets the electric adjusted seat firmness in a car, too medium. The glasses remember the setting, and the next time the user uses the car, if the seat setting is different than the setting the user used the last time, the glasses sets the seat to the last used user seat setting.

The glasses and device use computers, and computer languages which allow them to communicate. The Glasses and devices user radio waves which allow them to communicate, such as, WIFI direct, or Bluetooth. The Glasses and device could also communicate using infrared light, or laser light.

Filtering the Number of Devices, the Glasses Connect to

The user can set the distance that the glasses detects external devices. Limiting the number of devices detected might be used to decrease the choices available, which limits the distance that the user needs to travel to a device. The devices connection range to the glasses may be limited, by the radio range of the transmitter. The location of the device may limit, the devices broadcast range, for example, a device located in a basement, having radio interference.

The glasses can connect to more than one device at a time, and show the displayed devices on the glasses' display, and send settings to the devices.

Setting can be set for a group of devices, and have the setting used in the operation of the devices. The plurality of similar devices in the group can use the setting. The settings can be used by devices made by different companies, different class, category, and style of device. For example, the user has an electric car seat setting of medium. The medium setting can be used, by car seats in cars, made by different companies, used in trucks, and used by a driver's seat or passenger's seat.

Mid-Air Haptic Touch Corresponding to Store Checkout Hologram Input Icons Description and Operation A store checkout payment station 1502, uses an ultrasonic transducer array 1506 to create feel for holograms pinned to the array, in mid-air as illustrated in FIG. 15. The transducers are connected to a motor controller (not shown) which supplies power to the transducers. A computer (not shown) is connected to the motor controller.

The transducers produce ultrasonic waves, that are directed outward into the air, from the transducers. The waves are felt by in mid-air by a user's fingers. The computer directs, a turning on, and off, strength, length, duration, frequency, amplitude, and power, of the waves from the transducers.

The computer directs the motor controller, to supply power too different transducers to create different mid-air haptic touch, or feeling in mid-air. Mixed reality MR glasses 1502 pin holograms 1504, to the array, when the glasses are in view of the array.

The computer communicates wirelessly, with a computer in the glasses. The wireless communication, can use radio waves, laser light, or infrared light. The holograms are located near the array, to allow the transducer's mid-air touch, to occupy the same space as the hologram.

The MR glasses computer sends the transducer's computer, the coordinates of the holograms, located near the transducers. Software in the computer signals the transducers to create the mid-air feel in the same space as the pinned hologram.

The location that the holograms are pinned to, the shape of the holograms, orientation of the holograms to the pinned location, is sent to the transducer's computer. The transducer computer use's location, orientation, and shape information of the hologram, to create mid-air haptic feel in the same location as the hologram. The area that the user touches, is viewed by cameras in the glasses, or hand gesture recognition sensors, and by cameras (not shown) attached to the array. The computer signals the transducers, to send out waves, to create feel on the area of the hologram, that the user touches The feel is created by the waves. The user feels touch from the hologram on all of the 3D surfaces, that the user touches.

The holograms are pinned to a location above the array, and the shape, and orientation of the shape to the array is sent to the computer. The computer then sends waves to occupy the same space as the hologram. The Global Positioning Coordinates GPS coordinates of the hologram, are sent to the computer and the waves fill in in the shape of the hologram, as the user touches different surface areas of the shape.

The station calculates the price of the products, and sends the price, to glasses, and the glasses show the price displayed 1514 in mid air or pinned to a location, such as, near the station. The glasses computer could also communicate with a product scanner, and calculate the price, and display the price holographic ally in mid-air.

The cameras in the glasses, views the user's fingers as they touch the hologram. The visual detection of the touch of the hologram, is an input of the touched hologram. A holograms display 1514 shows the letters, and icons that have been typed, and are being typed. The typed letters can also be free floating, and viewed by the user.

The feel of the holograms, can be different at different times, such as, buzzing in the morning, soft oscillating waves in the evening, tingling during a party, and snowflakes falling during new years' eve. The icons pinned to the array, are positioned to be within touch of the user.

Mid-air haptic touch shares the same pace, as input icons. The input icons are pinned to the transducer array. Each hologram has a unique feel, such as, the number 1 can give a hard feel, the number 8 can give a soft feel, the number 5 can have an oscillating hard to soft feel, the number 6 can have a tingling feel, the number 7 can have a buzzing fell, the number 8 can fell like sand paper, the number 9 can have cool temperature feel. Other feels can be warm, hot, smooth, ruff, grooved, rubbery, hairy, pointy, and plastic.

The haptic computer, sends the user's MR headset computer information, that the icons are pinned to the array. The headset computer creates the view of the input icons pinned to the array. The MR computer can also send the transducer array computer the layout of the icon which are pinned to the array. The MR computer can view the array, and contact the array computer to communicate the icons position on the array.

The user can change the icons position on the array, for example, the icons for the store pay station, can be numbers 0-9, enter, cancel, change number. The array can be different shapes, such as, round, oval, triangular, shaped like a profile of a duck, rectangular, octagonal, and curved.

Mid-Air Haptic Touch Corresponding to Keyboard Key Icons Description and Operation The cameras 1616 in the glasses, and cameras adjacent to the keyboard 1610 view the users fingers as the user's fingers touch a hologram 1604, as illustrated in FIG. 16. The holograms are 3 centimeters above a transducer array. The visual detection of the touch of the hologram, is an input of the touched hologram. A hologram display (not shown) shows the letters that have been typed, and are being typed. The typed letters can also be viewed, on a physical electronic display.

The letters can give the same feel 1608 as letters typed on a physical keyboard, such as, the surface feel of the letters, the resistance when pressing the letters, the stop feel when the letters are pressed all the way.

Mid-Air Haptic Touch Corresponding to 3D Objects Description and Operation

A 3D array is used to give mid-air haptic touch to a hologram. A transducer array 1706 can be three dimensional, with arrays shaped differently, such as, a ball, half of a sphere, a cube, a square based pyramid, a triangle based pyramid, a cone, a cylinder, tetrahedron, and a cuboid. The transducers are on the outside of the shapes. Holograms 1704 can be pinned around the 3D array's shape. The triangle base pyramid can have an icon, on the upper surface of the pyramid, one side can have the number one pinned to one of it's top side surfaces. The next surface can have the number 2 pinned, to the next top side surface. Each number corresponds to an operation of a device.

The hologram is projected, onto the outside of the shapes. The shape is inside of the hologram, or the hologram overlays the shape.

A glasses camera 1702 views, where a user's fingers 1712 touch the holograms. The camera sends the information of the user's fingers in relation to the holograms, to the transducer's computer. The transducer's computer, directs ultrasonic feel, to where the user's finger touches the hologram, giving the hologram mid-air feel to the user's fingers. The holograms can also have feel, that is created by the sonic waves filling the hologram, or being in the same location as the pinned hologram.

It will be readily understood that the aspects of the present disclosure, as generally described herein, and illustrated in the figures, can be arranged, substituted, combined, separated, and designed in a wide variety of different configurations, all of which are explicitly contemplated herein.

Body Sized Transducer Array Description and Operation

A body sized transducer array 2006 is used to deliver mid-air touch to a user's body 2010, as depicted in FIG. 20. The user feels mid-air touch, over their whole body. The user feels mid-air touch shapes, associated with visual shapes, seen in the mixed reality glasses 2002. The user can touch the shapes with their hand, and also change the visual, and touch shape of the object. A hand gesture recognition sensor, or camera in the headset views the user's hands in mixed reality.

Wearing a minimal number of clothes, allows the haptic touch to contact the body, more efficiently. The user can support themselves by holding a hand rail. The user can also sit on a chair, inside the arrays, while feeling mid-air touch shape, and viewing mixed reality I reality shapes.

The glasses are wirelessly connected to a transducer computer. The transducer computer, is connected to the array, and the internet. The computer is connected to a motor controller. The motor controller is connected to the array. The computer has software, for signalling the motor controller, to send electricity to the transducers. The electrical powered transducers create ultrasonic waves, which create the mid-air feel.

Two Users Touching the Other User's Touch Feedback Hologram Description and Operation Two users 1810, 1812 each send, a holographic avatar of themselves, over the internet, to the other user, as illustrated in FIGS. 18, and 19. Each user views, the other user's avatar, though MR glasses 1802, 1814. Each user feels mid-air haptic touch 1808 1820 associated to the other user's hologram. The touch is created by a transducer array 1806, 1818 on which the hologram is pinned. The users simultaneously interact, with each others hologram, as the users would, if they were both physically touching each other, such as, shaking each others hands.

Two computers connect to each other over the internet. Each glasses connects to their own computer wirelessly. Each array connects to their computer. A microphone, and speaker, are connected to the glasses computer, in the headset, which allows the users to speak to each other, over the internet.

Creating 3D Feel OF Holograms

Four gesture recognition sensors, cameras are connected to a computer. The sensors have a view of the user near the arrays. The cameras are attracted close to the arrays.

The location that the hologram is pinned to, the shape of the hologram, and orientation of the shape of the hologram, to the pinned location, is sent to the transducer's computer.

The computer use's location, orientation, and shape information of the hologram to create mid-air haptic feel, in the same location as the hologram. The area that the user touches is viewed by the camera in the glasses, and by cameras 1822 attached to the array. The computer signals the transducers to create feel on the area of the holograms that the user touches. The user feels touch, from the hologram on all the of the 3D surfaces, that the user touches, feel which is created by the transducers, and computer.

Four arrays, are connected to the computer. The bottom array creates a top mid-air feeling for the object. The array projects the ultrasonic haptic mid-air touch feel perpendicular from the face of the array. The top array creates bottom feel of the object. The left and right array creates the left and right touch sides of the object. A combination of bottom array and left side array can be used to create feeling for the object. All 4 arrays also can be used to simultaneously, to create feeling for the object.

The computer is programed with mid-air touch creating shape software, mixed reality software, visual image and mid-air touch shape movement synchronization software, mid-air hand gesture recognition software, and computer operating software.

The glasses and the haptic touch transducer array, are combined to allow a user to view, and feel 3D images, on a display in the glasses. Mid-air ultrasound created shapes are associated to and similar to the images. The displayed 3D images, 3D objects are located near the transducer array.

A computer first creates the visual 3D objects, and secondarily creates haptic touch in mid to add touch feel to the objects. The computer could also reverse the creation of the touchable holograms by first creating the mid-air touch shape and then super imposing the displayed 3D object on the touch shape. The computer could also simultaneous create the visual objects, and mid-air touch shape. The touch shape moves in sync, with the visual 3D shape's movements.

The headset can view stationary and moving objects, in mixed reality, and 3D environments. The user can use their fingers to interact with and touch the holograms, such as, moving them, feeling their movements, and feeling their weight, etc. The user can interact with other user's avatars over the internet. The user can feel the other user's avatars, by positioning them near the array. The users can touch each other avatars, and simultaneous receive, touch and visual feedback.

Three dimensional cameras can be used to view, and to create 3D models of locations, such as, rooms, people, a bird, and objects. Three-dimensional 3D cameras, such as, a Matterhorn 3D camera, a Panasonic 3D camcorder, and an Aiptek 3D camcorder. The Matterhorn camera maps 3D spaces of rooms, which avatars can move in, view, and interact in the room.

3D Art Galleries

Sculptures and objects can be created by changing the shape of a pliable object by changing the shape of an object in mid-air with the user's hand. Environments can be created where user created objects are displayed and touchable by other users.

Moving Holograms

The mixed reality displayed environment, can be limited to the area near the arrays. The user can touch and feel objects, move objects, zoom in and out on objects, enlarging or making the object smaller, changing the shape of objects, cutting objects, and combining objects.

The displayed environment can also be the area outside of the array, with the array used for creating mid-air touch for objects that can be placed near, the array, by the user picking up the object and placing it near the array. Objects can also be placed near the array, by the mixed reality world changing its location, and the array staying stationary, for example, if the user moves a pumpkin in the mixed reality world, the pumpkin's location in the world may be moved to the array.

The mid-air touch is associated to what is near the array, for example, if a strawberry is receiving mid-air touch, the user can touch the whole strawberry. If the strawberry is enlarged to where only a portion of the visual strawberry is near the array, the user can touch the part of the strawberry near the array. The feeling of the strawberry, would change to that of what the enlarged strawberry would fell like.

Changing the Shape of Holograms

The user's hand, or other body part can be used, to interact with 3D visual mid-air touch objects. The hand is able to touch and feel objects, move objects, zoom in and out objects, enlarging or making the object smaller, The user can input commands on a keyboard, or mid-air hand gestures, to change the shape of an object. The user activates an object shape changing mode, the object can stay stationary, and the user can use the avatar to contact and pull or push the object, to indent, compress, or pull, or elongate an area of the object.

A display menu can show a menu of display functions. The functions can be activated by touching the function with a user movable avatar.

In object material removing mode, material can be added or removed, by the avatar grasping a part of the object to be removed, and moving it away from the object, detaching it from the object. To change the objects shape, detached material can be added by replacing it the removed area, or in a different area. Objects can be combined to change their shapes. The objects are put in combining mode. Two or more objects can be place together, touching each other. The objects are fussed, joined together, where they touched, when the combing mode is exited. An object cutting tool can be used to cut, and separate an area of the visual image of the object Holograms for Health Diagnosis A health care provider, can view and feel the inside of a patient's artery. The provider, using the avatar, can indent displayed plaque inside the artery. The provider can remove plaque, and an artery stent can be placed inside the artery. The provider can feel, and view how the change to the artery, effects the feel, and view of the artery.

Viewing mixed reality through the headset glasses, can provide a surgeon with information, which are otherwise hidden, such as showing the heartbeat rate, the blood pressure, the state of the patient's organ, and feel of the patient.

Medical providers can operate robotic surgery machines, over the internet, performing surgery on a patient. The surgery provider can mid-air touch feel the operation of the robotic hand input devices, and feel the input devise inter action with the patient's body. The provider can also hold and operate mid-air touch tools, and feel the tools, and with the patient's body.

Different Feel of Holograms

The haptic touch array creates mid-air touch that give mid-air feel shape similar to the visual 3D, mid-air hologram object's shape. The mid-air touch can also create the mass; weight feel of an object. The temperature of an object can be simulated. The movement of an object can be felt by the user.

Objects may be another user's hand, which can be shaken in mid-air, mid-air holograms creatures, and 3D mid-air avatars from online player worlds. Objects can be from locations, such as, 3D pyramids, Stonehenge, the Great Wall, Google Moon, and Google Mars. Objects can be locations, such as, mid-air holograms of museum's collections, mid-air holograms of the Smithsonian or Louvre museums art, mid-air holograms from Google Earth, providing 3D mid-air views of travel destinations, locations around the world, 3D mid-air views of medical patients' bodies, 3D views of and mid-air touch inside an engine, moving holograms of people's faces, and bodies.

Two computer avatars can interact, and exchange user data with each other. A multiple of moving avatars, such as 5 or more user's computers avatars, could be connected to each other, and can interact with each other.

The computer identifies objects by code in the object that tells the computer what the object is. For objects that don't have computer code, the computer can use object recognition to identify the object, for example, the avatar touches a table, the object recognition software identifies the table, and creates a table shape. The table shape can be moved. The space left by the moved table, is filled in with visual information similar to the visual information surrounding the object MR Glasses Users Interacting Real time 2D, or 3D cameras and displays can be used at locations in the world, and view real world objects and people. The cameras allow to people at the location, and mixed reality MR users on the internet to congregate and communicate with each other. Locations where people, and MR users on the internet, can go to, and meet each other, talk to each other, and can touch each other. MR users can meet other people on the internet, and go to a café and have a coffee anywhere in the world, and communicate with people at the location they go to. The MR user can have an avatar located at a location that is viewable, by other mixed reality users. The user can view the other user's avatars.

The users and their avatars can communicate with each other, using touch, visually, and audibly. The mixed reality users can communicate with people at locations, with displays, microphone, and speakers, at the locations. Locations where people, congregate may include, cafes, bars, taverns, restaurants, outdoor café, beaches, music concert halls, sports events, libraries, lectures, and class rooms. Cameras can be placed that allow people on the internet using mixed reality headsets, and displays, to communicate with people, at locations.

MR users and people at the location can interact with each other.

People at the location can view MR users, or the user's avatar on a display, or on MR glasses, or holographic projections. MR users can view the people, using cameras at the location. People and the user can touch each other, using connected arrays. Users talk to each other using microphones, and speakers. Users avatar's at cafes, can order mixed reality coffee and food, which can be sold by the café. Mixed reality tables can be set up for mixed reality I users to sit at.

An example of MR user's and people at a location could be, the user can, mixed reality travel to a casino and place bets on a dice betting table. The table can be set to accommodate MR players. The table can have a screen that shows where a MR payer places their bets, or someone could place the bets for them. The MR traveler's face, or body and face can be shown on a display, which users at the table can view. The MR user could choose to be seen or be invisible, by other mixed reality travelers, and people at the location.

Using a Machine Over the Internet

A dice throwing machine could be at the table and connected to the internet, to allow the MR user to control the machine. The MR user could throw dice using the machine. The dice machine can allow the MR user to feel the dice rolling around in the dice machines hand, and be controlled by the hand movements of the MR user. Similar to the feel of dice being shaken by people at the table. The MR user's presence and actions at the table are the same as people at the table, except the MR user's body isn't physically present.

Business meetings can be held, with people at a location, and have mixed reality users also participle at the meeting's location. User can play online computer games, such as, online internet role playing games. Users can view, touch and feel touch objects, and avatars in the game.

MR glasses which are connected, to the mid-air touch generating transducer arrays, can be used by the user, and other users with MR glasses, connected to the user, for the user to give, and receive sexual stimulation with other users. Visual and mid-air touch avatars can be used by the user, or computer, or another user to direct genital stimulation at the user's genitals. Avatars can also be used, by users, to stimulate the other user's genitals.

Users can use the avatars to engage in simultaneous genital simulation, with each other user, over the internet. The array can be located near the user's genital's, to mid-air touch stimulate the genitals, by producing feelings similar to sexual stimulation, or other unique feelings made possible by the mid-air touch shapes.

A 3D printer can be connected the computer. The user can instruct the computer, to instruct the 3D printer, to print the 3D shape of the object. The printer prints, the 3D shape of the object, from received computer instructions. A 2D printer can be connected, to the computer. The user can print the 2D visual view, of the object.

Conclusions, Ramifications and Scope

From the preceding description, and drawings it becomes apparent that the user, may use a mixed reality hologram glasses to operate a device sanitarily.

Thus the reader will see that at least one embodiment, of the user MR glasses connected to a device, provides a more reliable, fun, healthier and economical device that can be used by persons of almost any age.

The MR glasses, allow a user to input holograms in mid-air. The mid-air input can be used to direct the operation of a device, such as, a smart toilet. The mid-air input, allows input, without the need to contact a physical surface. Avoiding contact with an input surface, decrease the chance of touching bacteria on the surface, with the user's finger. Avoiding bacteria increases the ability, to remain bacterially free, from bacteria which may have a negative impact on the user's body.

It will be apparent that various changes and modifications can be made, without departing from the scope of the various embodiments, as defined in the claims. Thus the scope of the embodiments, should be determined by the appended claims, and their equivalents, rather than by the examples given.

The invention claimed is:

1. Glasses connected to a device, the glasses being mixed reality glasses comprising,
   the glasses have a glasses computer,
   the device has a device computer,
      the glasses computer is wirelessly connected to the device computer,
   the device has a plurality of operations that are different from each other, a touch system comprising a plurality of transducers,
   the transducers create a haptic touch feel in midair,
   the haptic touch feel is located at a predetermined distance from the transducers,
the glasses display input icons in midair,
   the glasses are configured to position the input icons at the same location as the midair touch,
   the input icons are positioned to be contacted by a finger of a user,
   the glasses display information about the operation of the device in midair,
   the input icons and information are viewable by the user while the user wears the glasses,
   the glasses have a sensor,
      the sensor is positioned to detect contact of the finger of the user with one of the input icons,
      a detection of a touch of one of the input icons is associated to an activation of the input icon detected being touched,
   each input icon displays one of the operations of the device,
      each of the displayed operations is associated to the operation of the device that is displayed,
         an activation of one of the input icons is associated to an activation of the operation of the device that the input icon is associated to,
      the activated operation of the device is displayed by the information.

2. The glasses of claim 1, wherein the sensor is a camera.

3. The glasses of claim 1, wherein the input icons are three-dimensional input icons.

4. The glasses of claim 1, wherein the device is a user store checkout payment device,
   the operation of the device that is displayed is an operation of the device that is an enter command,
   the associated operation of the device is an operation of the enter command.

5. The glasses of claim 1, wherein the device is a keyboard,
   the operation of the device that is displayed is an operation of the device that is an e letter,
   the associated operation of the device is an operation of the e letter.

6. The glasses of claim 1, wherein the wireless connection is an internet connection,
   the glasses are connected to the internet,
   the device is connected to the internet.

7. The glasses of claim 1, wherein the wireless connection is a radio wave connection.

8. The glasses of claim 1, wherein the transducers are positioned to create a transducer array,
   the transducer array is connected to a transducer array computer,
   the glasses computer is wirelessly connected to the transducer array computer,
   the glasses computer instructs the array computer to affect the haptic touch created by the transducer array.

9. A method for operating a device with glasses, the glasses being mixed reality glasses, comprising,
   displaying information about an operation of the device in midair, with the glasses configured to display information about an operation of the device in midair, the information viewable by a user,
   creating a haptic touch in midair, with a plurality of transducers producing the haptic touch in midair, the haptic touch is located at a predetermined distance from the transducers,
   displaying input icons at the location of the haptic touch, with the glasses configured to locate the input icons at the location of the haptic touch,
   labeling one the of the input icons with an operation of the device that an activation of the input icon is associated to activating, with the device having operations that are different from each other,
   touching one of the input icons, with the input icons positioned to be able to be touched,
   detecting the touch of one of the input icons by the user, with a sensor in the glasses positioned to view the touch of the input icons, the glasses configured to detect the touch of one of the input icons,
   connecting the glasses wirelessly to the device, with a wireless connection between the glasses and the device,
   activating the input icon detected being touched, with an association of the detection of the touch of one of the input icons to an activation of the input icon detected being touched,
   activating the device operation associated to the activated input icon, with an association of the activation of the input icon to an activation of the operation of the device that is labeled by the input icon,
   displaying the activated operation of the device by the displayed information.

10. The method of claim 9, wherein the wireless connection is a radio wave connection between the glasses and a phone,
   the phone is located on the user,
   the phone is connected to an internet by radio waves,
   the device is connected to the internet,
   the phone is connected to the device through the internet.

11. The method of claim 9, wherein the connection is a light wave connection,
   the glasses have a glasses light wave transmitter and receiver,
   the device has a device light wave receiver and receiver.

12. The method of claim 9, further providing producing a sound when the input icon is activated,
   with a speaker connected to the glasses, the activation of the input icon is associated to an activation of the speaker,
   the activated speaker produces a sound.

13. The method of claim 9, further providing increasing brightness of the one of the input icons when the one of the input icons is detected as being contacted by a finger of the user.

14. The method of claim 9, wherein the transducers are positioned to create a transducer array,
   the transducer array is connected to a transducer array computer,
   the glasses computer is wirelessly connected to the transducer array computer,
   the glasses computer instructs the array computer to affect the haptic touch created by the transducer array.

15. The method of claim 9, further providing a broadcast by the device that input icons are available to be sent to the glasses,
   a search by the glasses for the broadcast of the device,
   a connection of the glasses to the device when the glasses detect the broadcast of the device,
   a sending of the input icons by the device to the glasses when the device and glasses connect.

16. The method of claim 9, wherein the device is a store checkout payment device,
- the label of one the input icons is an input icon that is labeled as a zero,
- the associated device operation is a zero operation.

17. The method of claim 9, wherein the device is a keyboard,
- the label of one the input icons is an input icon that is labeled as a backspace,
- the associated device operation is a backspace operation.

18. The method of claim 9, wherein the computer has a storage,
- further providing the input icons are stored in the storage,
- the input icons in the storage are displayed the next time the glasses connect to the device.

\* \* \* \* \*